(12) United States Patent
Tomici et al.

(10) Patent No.: US 12,375,917 B2
(45) Date of Patent: Jul. 29, 2025

(54) SERVING GATEWAY EXTENSIONS FOR INTER-SYSTEM MOBILITY

(71) Applicant: InterDigital Patent Holdings, Inc., Wilmington, DE (US)

(72) Inventors: John L. Tomici, Southold, NY (US); Michael F. STarsinic, Newton, PA (US); Qing Li, Princeton Junction, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/472,122

(22) Filed: Sep. 10, 2021

(65) Prior Publication Data
US 2021/0409948 A1 Dec. 30, 2021

Related U.S. Application Data

(63) Continuation of application No. 15/119,920, filed as application No. PCT/US2015/016481 on Feb. 19, 2015, now Pat. No. 11,146,956.
(Continued)

(51) Int. Cl.
*H04W 12/069* (2021.01)
*H04L 9/40* (2022.01)
(Continued)

(52) U.S. Cl.
CPC ....... *H04W 12/069* (2021.01); *H04L 63/0281* (2013.01); *H04L 63/0892* (2013.01);
(Continued)

(58) Field of Classification Search
CPC ... H04W 12/069; H04W 76/11; H04W 92/02; H04W 36/14; H04W 84/042;
(Continued)

(56) References Cited

U.S. PATENT DOCUMENTS 7,406,324 B1 7/2008 McConnell
9,414,281 B2 8/2016 Liu
(Continued)

FOREIGN PATENT DOCUMENTS

CN 106068026 A 11/2016
JP 2011-509615 A 3/2011
(Continued)

OTHER PUBLICATIONS

3GPP TSG-SA WG2#65 TD S2-084432 Handling Multiple PDN During Handover Attach Procedure, May 2008, 24 pages.
(Continued)

*Primary Examiner* — Will W Lin
(74) *Attorney, Agent, or Firm* — Mark D. Pratt

(57) ABSTRACT

Methods, devices, and systems related to serving gateway extensions for inter-system mobility in integrated small Cell and WiFi networks. An SGW may be extended into a common intermediate gateway for both LTE and WiFi access. A GTP-based "SI a" interface between a TWAN and an SGW is introduced. The STa interface between TWAN and 3 GPP AAA server/proxy is extended to enable selection of an SGW for establishment of the disclosed Sla interface. The extended SGW and protocols may be used to optimize inter-system mobility between LTE small cells and trusted WiFi. SGW and PDN Gateway (PGW) functionality is disclosed to support GTP-based IP Flow mobility via multi-access (LTE and WiFi) connectivity to the same packet data network (PDN). Non-access stratum (NAS), EAP, and GTP-C protocols may also be extended to include a "multi-connection" indication in addition to existing "handover" indication.

12 Claims, 21 Drawing Sheets

Related U.S. Application Data

(60) Provisional application No. 61/941,600, filed on Feb. 19, 2014.

(51) Int. Cl.
*H04W 36/14* (2009.01)
*H04W 76/11* (2018.01)
*H04W 92/02* (2009.01)
H04W 84/04 (2009.01)
H04W 84/12 (2009.01)
H04W 88/06 (2009.01)
H04W 88/16 (2009.01)

(52) U.S. Cl.
CPC ........ *H04W 36/1446* (2023.05); *H04W 76/11* (2018.02); *H04W 92/02* (2013.01); *H04W 84/042* (2013.01); *H04W 84/12* (2013.01); *H04W 88/06* (2013.01); *H04W 88/16* (2013.01)

(58) Field of Classification Search
CPC ..... H04W 84/12; H04W 88/06; H04W 88/16; H04W 12/06; H04L 63/0281; H04L 63/0892
See application file for complete search history.

(56) References Cited

U.S. PATENT DOCUMENTS

| | | | |
|---|---|---|---|
| 2006/0045069 A1 | 3/2006 | Zehavi et al. | |
| 2010/0027448 A1* | 2/2010 | Puthiyandyil | H04W 76/15 370/310 |
| 2010/0278108 A1 | 11/2010 | Cho et al. | |
| 2010/0323700 A1 | 12/2010 | Bachmann et al. | |
| 2011/0099604 A1* | 4/2011 | Zhou | H04L 41/06 726/1 |
| 2011/0319072 A1 | 12/2011 | Ekici et al. | |
| 2013/0028172 A1* | 1/2013 | Lim | H04W 36/12 370/315 |
| 2013/0077482 A1 | 3/2013 | Krishna et al. | |
| 2013/0295940 A1* | 11/2013 | Chan | H04W 36/22 455/437 |
| 2014/0064068 A1 | 3/2014 | Horn et al. | |
| 2014/0071907 A1* | 3/2014 | Roeland | H04W 76/12 370/329 |
| 2014/0086211 A1 | 3/2014 | Liu | |
| 2014/0177600 A1 | 6/2014 | Tsai et al. | |
| 2014/0185519 A1* | 7/2014 | Zhang | H04L 45/308 370/328 |
| 2014/0241333 A1 | 8/2014 | Kim et al. | |
| 2015/0029956 A1* | 1/2015 | Moses | H04B 7/0686 370/329 |
| 2015/0109927 A1 | 4/2015 | Ozturk et al. | |
| 2015/0120890 A1 | 4/2015 | Ghai | |
| 2015/0173000 A1 | 6/2015 | Basilier et al. | |
| 2015/0195767 A1* | 7/2015 | Trang | H04L 45/38 370/331 |
| 2015/0282026 A1* | 10/2015 | Gupta | H04W 56/0095 370/331 |
| 2015/0341845 A1 | 11/2015 | Hedberg et al. | |
| 2015/0382386 A1* | 12/2015 | Castro Castro | H04W 76/11 370/329 |
| 2016/0066234 A1* | 3/2016 | Cho | H04W 36/302 370/331 |
| 2016/0073450 A1 | 3/2016 | Vikberg et al. | |
| 2016/0119347 A1 | 4/2016 | Liu et al. | |
| 2016/0127891 A1 | 5/2016 | Nylander et al. | |
| 2016/0127964 A1 | 5/2016 | Roeland et al. | |
| 2016/0150464 A1* | 5/2016 | Zhang | H04L 41/0893 370/254 |
| 2016/0165518 A1 | 6/2016 | Keller et al. | |
| 2016/0205586 A1 | 7/2016 | Kim et al. | |
| 2016/0212691 A1 | 7/2016 | Roeland et al. | |
| 2017/0231020 A1* | 8/2017 | Tomici | H04W 36/1446 |
| 2017/0289866 A1* | 10/2017 | Watfa | H04W 36/0033 |

FOREIGN PATENT DOCUMENTS

| | | |
|---|---|---|
| WO | 2011/157129 A2 | 12/2011 |
| WO | 2013/164465 A1 | 11/2013 |
| WO | 2015/062643 | 5/2015 |
| WO | 2015/126999 A1 | 8/2015 |

OTHER PUBLICATIONS

3rd Generation Partnership Project (3GPP), TR 23.852 V12.0.0, "Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG)"; Stage 2 (Release 12), Sep. 2013, 1-157 pages.

3rd Generation Partnership Project (3GPP), TR 43.902 V11.0.0, 3rd Generation Partnership Project; "Technical Specification Group GSM/EDGE Radio Access Network; Enhanced Generic Access Networks (EGAN) study" (Release 11), Sep. 2012, 1-134 pages.

3rd Generation Partnership Project (3GPP), TS 22.234 V11.0.0, 3rd Generation Partnership Project; "Technical Specification Group Services and System Aspects; Requirements on 3GPP System to Wireless Local Area Network (WLAN) Interworking" (Release 11), Sep. 2012, 1-15 pages.

3rd Generation Partnership Project (3GPP), TS 23.203 V12.3.0, 3rd Generation Partnership Project; "Technical Specification Group Services and System Aspects; Policy and Charging Control Architecture" (Release 12), Dec. 2013, 1-215 pages.

3rd Generation Partnership Project (3GPP), TS 23.234 V11.0.0, 3rd Generation Partnership Project; "Technical Specification Group Services and System Aspects; Policy and Charging Control Architecture" (Release 12), Sep. 2012, 1-84 pages.

3rd Generation Partnership Project (3GPP), TS 23.402 V12.3.0, 3rd Generation Partnership Project; Technical Specification Group Services and System Aspects; Architecture enhancements for non-3GPP accesses (Release 12), Dec. 2013, 1-288 pages.

3rd Generation Partnership Project (3GPP), TS 29.273 V12.2.0, 3rd Generation Partnership Project; Technical Specification Group Core Network and Terminals; Evolved Packet System (EPS); 3GPP EPS AAA interfaces (Release 12), Dec. 2013, 1-134 pages.

3rd Generation Partnership Project (3GPP), TS 29.274 V12.3.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Dec. 2013, 1-236 pages.

3rd Generation Partnership Project (3GPP), TS 29.281 V11.6.0, 3rd Generation Partnership Project; Technical Specification Group Core Network and Terminals; General Packet Radio System (GPRS) Tunnelling Protocol User Plane (GTPv1-U) (Release 11), Mar. 2013, 1-27 pages.

3rd Generation Partnership Project (3GPP), TS 33.402 V12.2.0, 3rd Generation Partnership Project; Technical Specification Group Services and System Aspects; 3GPP System Architecture Evolution (SAE); Security aspects of non-3GPP accesses (Release 12), Dec. 2013, 1-55 pages.

3rd Generation Partnership Project (3GPP), TS 43.318 V, 3rd Generation Partnership Project; Technical Specification Group GSM/ EDGE Radio Access Network; Generic Access Network (GAN); Stage 2 (Release 11), Sep. 2012, 1-128 pages.

ZTE: "Clarification on how to use PCO on the S2a GTP interface", 3GPP TSG-CT WG4#64, C4-140068, Guangzhou, Jan. 20-24, 2014, 20 pages. Available at: https://www.3gpp.org/ftp/tsg_ct/WG4_protocollars_ex-CN4/TSGCT4_64_Guangzhou/Docs?sortby=namerev.

* cited by examiner

SERVING GATEWAY EXTENSIONS FOR INTER-SYSTEM MOBILITY

CROSS REFERENCE TO RELATED APPLICATIONS

This application is a continuation of U.S. application Ser. No. 15/119,920 filed Aug. 18, 2016, which is a National Stage Application filed under 35 U.S.C. 371 of International Application No. PCT/US2015/016481, filed Feb. 19, 2015, which claims priority to, and incorporates by reference in its entirety, provisional application 61/941,600 filed Feb. 19, 2014.

BACKGROUND

As wireless communications technologies evolve, additional demands are placed on wireless systems to support more extensive use of wireless devices. For example, wireless devices may now often traverse several access networks, both trusted and untrusted. Challenges are introduced in transferring communications between the various networks to which wireless devices may have access, such as LTE and WiFi networks or trusted and untrusted networks. Current solutions to these challenges are often resource intensive and potentially disruptive to communications ongoing on the device transferring between such networks.

SUMMARY

Methods, devices, and systems related to serving gateway extensions for intersystem mobility in integrated small Cell and WiFi networks are described. In an embodiment, a serving gateway (SGW) may be extended into a common intermediate gateway for both LTE and WiFi access. A GTP-based "S1a" interface between a TWAN and an SGW can be used for this purpose. The STa interface between the TWAN and a 3GPP AAA server/proxy may be extended to enable selection of an SGW for establishment of the disclosed S1a interface. Extensible authentication protocol (EAP) and core network GPRS tunneling protocol (GTP) may be used to support newly disclosed information over the STa and S1a interfaces.

Methods, devices, and systems that use the extended SGW and protocols to optimize inter-system mobility between LTE small cells and trusted WiFi are also described. In an embodiment, the extended SGW functionality, and extended PDN Gateway (PGW) functionality, may be used to support GTP-based IP flow mobility via multi-access (LTE and WiFi) connectivity to the same packet data network (PDN). Non-access stratum (NAS), EAP, and GTP-C protocols may also be extended to include a "multi-connection" indication in addition to the existing "handover" indication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
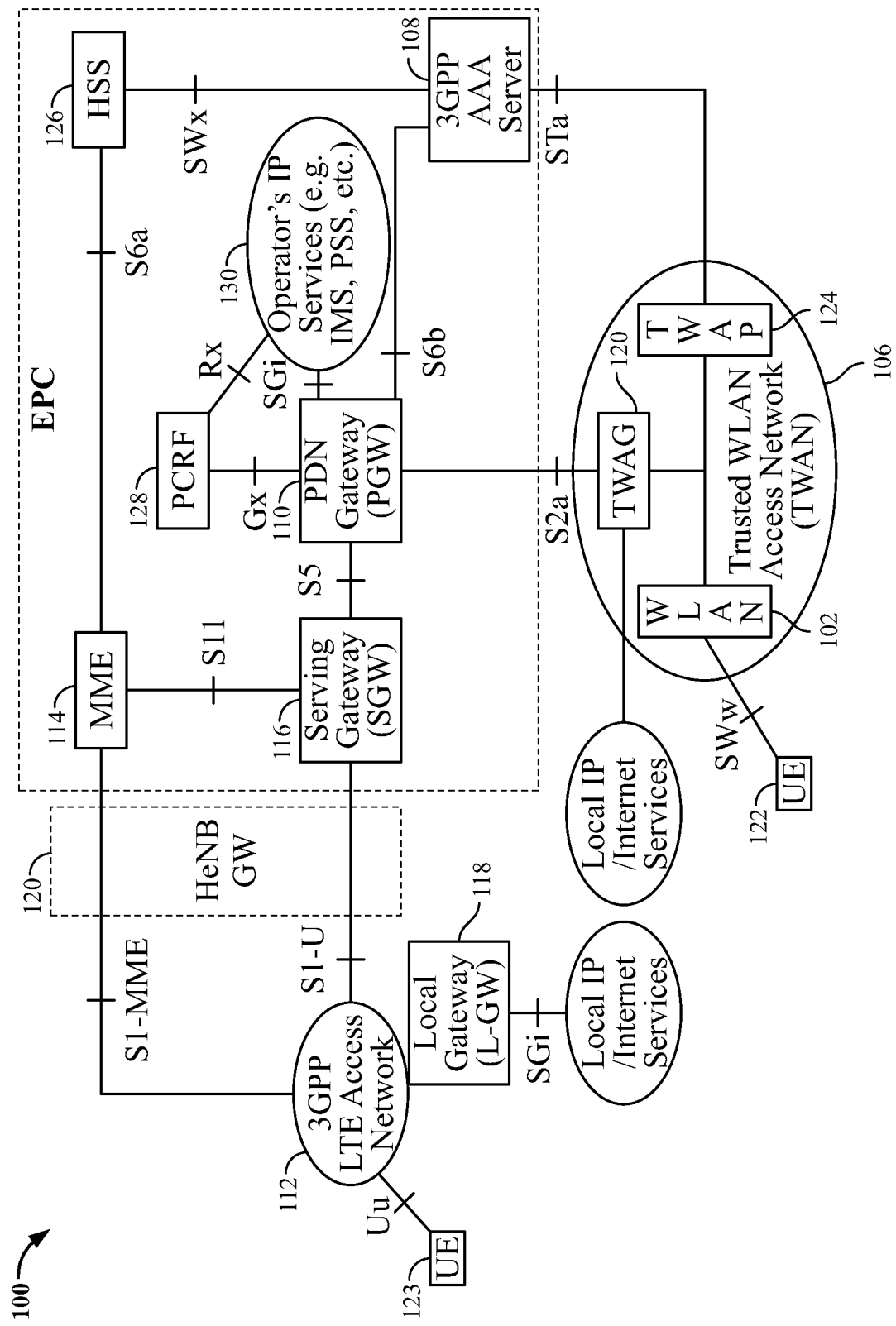
FIG. 1 illustrates example architecture for non-roaming trusted WLAN and 3GPP LTE access to an EPC.

The disclosed embodiments address bandwidth management and traffic offload for "Integrated Small-cell and WiFi" (ISW) networks. ISW networks can exploit the widespread increase in wireless data usage by leveraging the deployment of small cells in the licensed spectrum along with WiFi access points in the unlicensed spectrum. Mobile Network Operators (MNOs) are beginning to incorporate carrier-grade WiFi in ways that complement their cellular and core networks using cost-effective integration and interworking. This may drive development of a variety of network architectures, subscriber service options, and policy management mechanisms.

ISW network requirements are expected to address lower cost alternatives for Internet traffic offload via WiFi, service continuity between cellular and WiFi, simplified network deployment and management, and enhanced policy-based multi-access traffic management (e.g., via dynamic traffic steering across cellular and WiFi access technologies). The embodiments set forth herein provide solutions for inter-working of LTE and WiFi access networks at the Serving Gateway (SGW). By extending solutions for inter-working at the PDN Gateway (PGW) to the SGW, core network signaling may be reduced and the quality of experience for MNO subscribers in ISW network environments may be improved.

As used herein, "small cells" are geographic areas providing mobile network access via 3GPP-defined radio access networks (RATs) using operator-licensed spectrum. Although 2G and 3G versions of these cellular RATs support circuit-switched as well as packet-switched services, the instant disclosure addresses primarily packet services and particularly packet services on 4G LTE RATs providing access to the Evolved Packet Core (EPC) network.

As used herein, "WiFi hotspots" are geographic areas providing wireless network access using unlicensed spectrum via RATs standardized by IEEE 802.11 with equipment certified by the WiFi Alliance (WFA). WiFi hotspots may also provide WiFi access to the EPC network in addition to direct access to a local area network and/or the Internet.

As used herein, an "Integrated Small Cell and WiFi Network" (ISWN) is a joint access network deployed by mobile operators including potential enhancements to multi-RAT terminal capabilities, small cell and WiFi access capabilities, EPC, network gateways, and policy and traffic management functions.

Today, mobile network operators (MNOs) typically employ WiFi only for offloading "best effort" Internet traffic from their cellular and core networks. However, increased interest in operator deployment of "small cells" and "carrier WiFi" will encourage MNOs to seek new standard and/or vendor solutions for better interoperability between local cellular and WiFi networks enabling more control over their subscribers' Quality of Experience (QoE).

Specifically, as operators adopt "Carrier WiFi" to optimize their networks and reduce capital and operations expenditures, they may deploy trusted WLAN (Wireless Local Area Network) access networks (TWAN) that can directly interface with an operator's mobile core network (MCN). Greater integration of MNO deployed small cell and WiFi access networks within common geographical areas, such as high-traffic urban metropolitan hotspot locations, may also develop.

In this context, the term "trusted" applies to an MNO's belief that appropriate measures have been taken to safeguard access to its EPC via a WLAN access network. Such measures may, for example, include establishment of a tamper-proof fiber connection between the WLAN and EPC and establishment of an IPSec security association (SA) between the WLAN and a Security Gateway at the EPC edge. In contrast, if the WLAN access is deemed "untrusted" the WLAN may interface with an evolved Packet Data Gateway (ePDG) at the EPC edge and the ePDG may establish IPSec security associations directly with each UE accessing the EPC through the WLAN. The proposed trusted WLAN access network embodiments set forth herein may also be applied to untrusted WLANs.

FIG. 1 illustrates example architecture 100 for non-roaming trusted WLAN 102 and 3GPP LTE access to an EPC 104. According to some implementation, when a WLAN 102 is considered trusted by an operator, the TWAN 106 may be connected to the EPC 104 via the STa interface toward the 3GPP AAA Server/Proxy 108 and via the S2a interface toward the PDN Gateway (PGW) 110, as shown in FIG. 1. Comparing this to 3GPP LTE access, the LTE access network 112 (e.g., eNB) may be connected to the EPC 104 via the S1-MME interface toward the Mobility Management Entity (MME) 114, via the S1-U interface toward the Serving Gateway (SGW) 116, and indirectly via the S5 interface towards the PDN Gateway 110 (PGW as shown in FIG. 1). An optional local gateway function (L-GW) 118 is also shown for small cell LTE access (e.g., for Home eNB (HeNB) deployments). We also show an optional "HeNB Gateway" (HeNB GW) 120 that may be used to concentrate the control plane signaling for multiple HeNBs toward the MME 114 and may also be used to handle HeNB user plane traffic toward the SGW 116.

The gateways (Serving GW 110 114 116 and PDN GW 108110) deal with the user plane. They transport IP data traffic between the User Equipment (UE) 122 and 123 and the external networks. The Serving GW 110 116 is the point of interconnect between the radio-side, for example 3GPP LTE Access Network 110 112, and the EPC 104. As its name indicates, this gateway serves the UE 124 122 and 123 by routing incoming and outgoing IP packets. It is the anchor point for intra-LTE mobility (i.e. in case of handover between eNodeBs) and between LTE and other 3GPP accesses. It is logically connected to the other gateway, the PDN GW 110.

For untrusted WLAN access embodiments, the Trusted WLAN Access Gateway (TWAG) 120 functionality may be included in the ePDG and the PGW interface may be denoted as "52b". In addition, for the untrusted WLAN embodiments, the "SWa" and "SWn" interfaces are defined between the 3GPP AAA Server 108 and ePDG, respectively. The "SWu" interface supports IPSec tunnels between the UE 122 and the ePDG via the WLAN 102.

In some embodiments, the following functions may exist within the TWAN 106 shown in FIG. 1. A WLAN Access Network (WLAN AN) 102 may include one or more WLAN Access Points (APs) (part of WLAN 102). An AP terminates the WLAN IEEE 802.11 link from UE 122 via the SWw interface. The APs may be deployed as standalone APs or as "thin" APs connected to a Wireless LAN Controller (WLC), e.g., using the IETF CAPWAP protocols. A trusted WLAN Access Gateway (TWAG) 120 may act as the default IP router for the UE 122 on its WLAN access link and may terminate the GTP-based S2a interface with the PGW 110. It may also act as a Dynamic Host Configuration Protocol (DHCP) server for the UE 122. The TWAG 120 maintains a UE MAC address association for forwarding packets between the UE 122 (via the WLAN AP) and the associated S2a GTP-U tunnel (via the PGW) 110. A Trusted WLAN AAA Proxy (TWAP) 124 may terminate the Diameter-based STa interface with the 3GPP AAA Server 108. It may relay the AAA information between the WLAN AN 106 and the 3GPP AAA Server 108 (or Proxy in case of roaming). It may inform the TWAG 120 of layer 2 attach and detach events. It establishes the binding of UE subscription data (including IMSI) with UE MAC address and can provide such information to the TWAG 120.

A UE 122 or 123 may leverage USIM features for both 3GPP and non-3GPP, e.g., WiFi access. Non-3GPP access authentication may be the process that is used for Access Control (i.e., to permit or deny a subscriber to attach to and use the resources of a non-3GPP IP access which is inter-worked with the EPC network). Non-3GPP access authentication signaling may be executed between the UE 122 and the 3GPP AAA server/HSS. The authentication signaling may pass through AAA proxies.

Trusted 3GPP-based access authentication is executed across an STa reference point. The 3GPP based access authentication signaling may be based on IETF protocols such as the Extensible Authentication Protocol (EAP).

Authentication for non-3GPP access in EPS may be based on EAP-AKA (RFC 4187) or on EAP-AKA' (RFC 5448). The EAP server for EAP-AKA and EAP-AKA' may be the 3GPP AAA server 108 residing in the EPC 104. In some embodiments, untrusted WLAN access networks may use EAP-AKA while trusted WLAN access networks 106 may use the slightly modified EAP-AKA' protocol that includes the "Access Network Identifier" as part of the key derivation process.

Quality of Service (QoS) control for trusted WLAN access via GTP-based S2a may be implemented by having a UE 122 initiate an "initial attach" with the TWAN 106 using TWAN-specific L2 procedures. After standard EAP-based authentication, the TWAN 106 selects the default APN based on the received subscription data and sends a GTP-C "Create Session Request" to the PGW 110 associated with the APN. This request identifies the Radio Access Technology (RAT) type as non-3GPP and includes the Default EPS Bearer Quality of Service (QoS). The PGW 110 returns a "Create Session Response" to the TWAN 106 including the EPS Bearer QoS and the allocated UE IP address. The GTP-U tunnel is then set up between the TWAN 106 and PGW 110 with the appropriate QoS. Note that this QoS may only apply to the GTP tunnel and does not necessarily extend all the way to the UE 122.

An IPv4 address and/or an IPv6 prefix may be allocated to a UE 122 when a new PDN connection is established over TWAN 106. For instance, the TWAN 106 may request an IPv4 address for the UE 122 via the GTP Create Session Request. The IPv4 address may then be delivered to the TWAN 106 during the GTP tunnel establishment via the GTP Create Session Response from the PGW 110. When the UE 122 requests an IPv4 address via DHCPv4, the TWAN 106 may deliver the received IPv4 address to the UE 122 within DHCPv4 signaling. Corresponding procedures may also be used for IPv6 embodiments. For the case of non-seamless WLAN 102 offload (NSWO), the TWAN 106 may support a NAT function and may provide the UE 122 with a local IP address.

For Trusted WLAN access to the EPC 104, the PDN connectivity service may be provided by the point-to-point connectivity between the UE 122 and the TWAN 106 concatenated with S2a bearer(s) between the TWAN 106 and the PGW 110. The bearer model of the GTP-based S2a interface is similar to that of the GTP based S5/S8 interface (e.g., where the TWAG 120 function in the TWAN 106 is equivalent to the SGW 116).

The STa interface and Diameter application may be used for authenticating and authorizing the UE for EPC 104 access or for TWAN 106 access without EPC S2a access (i.e., non-seamless WLAN offload) via trusted non-3GPP accesses. For PMIP-based roaming, the 3GPP AAA Proxy determines whether to use S2a-S8 chaining. In cases where it has selected that option, it selects an SGW and adds the SGW address to the authentication and authorization answer that is sent upon successful completion of the authentication.

The HSS (for Home Subscriber Server) 126 is a database that contains user-related and subscriber-related information. It also provides support functions in mobility management, call and session setup, user authentication and access authorization.

The gateways (Serving GW 116 and PDN GW 110) deal with the user plane. They transport IP data traffic between the User Equipment (UE) 122 and 123 and the external networks. The Serving GW 116 is the point of interconnect between the radio-side, for example 3GPP LTE Access Network 112, and the EPC 104. As its name indicates, this gateway serves the UE 122 and 123 by routing incoming and outgoing IP packets. It is the anchor point for intra-LTE mobility (i.e. in case of handover between eNodeBs) and between LTE and other 3GPP accesses. It is logically connected to the other gateway, the PDN GW 110.

The PDN GW 110 is the point of interconnect between the EPC 104 and external IP networks, such as the Internet. These networks are called PDN (Packet Data Network), hence the name. The PDN GW 110 routes packets to and from the PDNs. The PDN GW 110 also performs various functions such as IP address/IP prefix allocation or policy control and charging. 3GPP specifies these gateways independently but in practice they may be combined in a single "box" by network vendors.

The MME (for Mobility Management Entity) 114 deals with the control plane. It handles the signaling related to mobility and security for E-UTRAN access. The MME 114 is responsible for the tracking and the paging of UEs in idle-mode. It is also the termination point of the Non-Access Stratum (NAS).

Policy and Charging Rules Function (PCRF) 128 determines policy rules in real-time for EPC 104. The PCRF 128 accesses subscriber databases and other specialized functions, such as a charging system, in a centralized manner.

Table 1 below shows the "Trusted non-3GPP Access Authentication and Authorization Answer" that defines optional inclusion of the "Serving GW Address" information element in the "MIP6-Agent-Info" Attribute Value Pair (AVP) for use in chained S2a-S8 cases. As discussed in further detail hereon, in some embodiments, the use of the Serving GW Address may be extended by defining a new Diameter AVP for use by the 3GPP AAA Proxy in GTP-based roaming and by the 3GPP AAA Server 108 in GTP-based non-roaming cases.

TABLE 1

"Serving GW Address" information element details

| Information element name | Mapping to Diameter AVP | Cat. | Description |
|---|---|---|---|
| Serving GW Address | MIP6-Agent-Info | O | This AVP shall be used only in chained S2a-S8 cases and it shall be sent only if the Result-Code AVP is set to DIAMETER_SUCCESS. |

The 3GPP Release 11 SA2 work item for "S2a Mobility based on GTP & WLAN access to EPC" (SaMOG) focused on enabling a GTP-based S2a interface to the PDN Gateway (PGW) for "Trusted WLAN Access Networks" (TWANs). This item precluded any solutions that would impact the UE. The Release 11 architectures, functional descriptions, and procedures for GTP-based S2a over trusted WLAN access were subsequently standardized. The applicable GTP control plane protocol for tunnel management (GTPv2-C) and the GTP user plane have also been standardized. SaMOG may be extended to address the Release 11 limitations and may include solutions requiring UE enhancements for UE-initiated PDN connectivity, multi-PDN connectivity, and seamless inter-system handover.

3GPP Release 10 standardized a GTP-based S2b interface for Untrusted WLAN access to the EPC. This included the associated support for a GTP-based S2b interface between an evolved Packet Data Gateway (ePDG) and the PGW. Untrusted WLAN solutions may require UE support for IPSec as well as EPC support of an ePDG for establishing an IPSec tunnel with the UE.

3GPP Release 6 provided a standardized WLAN Interworking (I-WLAN) solution by introducing a Packet Data Gateway (PDG) for WLAN access to the "pre-EPC" packet-switched core network. This release additionally described how to reuse existing GGSN deployments to implement the PDG functionality using a subset of the Gn interface (denoted as Gn') via a "Tunnel Termination Gateway" (TTG) using GTP towards the GGSN. Again, these solutions may require UE support for IPSec as well as PDG/TTG support for establishing an IPSec tunnel with the UE.

3GPP Release 6 also standardized Generic Access Network (GAN) support for 2G/WiFi dual-mode handsets. Release 8 added support for 3G/WiFi handsets. Unlicensed Mobile Access (UMA) is the commercial name used by mobile carriers for GAN access via WiFi. GAN-enabled UEs can use WiFi to interface with a "GAN Controller" (GANC) that presents itself as a 2G BSC or 3G RNC to the core network. GANC provides a circuit-switched (CS) interface to the MSC, a packet-switched (PS) interface to the SGSN, and a Diameter EAP interface to the AAA Server/Proxy. It also includes a Security Gateway (SeGW) that terminates IPSec tunnels from the UE. Table 2 below illustrates the basic requirements for each GTP-based WLAN solution.

(H)eNB) 123, and a PGW 110 (e.g., based on default APN retrieved from HSS 126 or specific APN requested by UE 123). The MME 114 then requests creation of a PDN connection via the SGW 116 and the SGW 116 executes signaling to establish the user plane tunnel with the PGW 110.

In contrast, for TWAN access, UE authentication and EPC 104 attachment is accomplished via EAP signaling over the STa interface between the TWAN 106 and 3GPP AAA Server/Proxy 108. For untrusted access, this would occur over the SWa interface between the untrusted WLAN and 3GPP AAA server 108. In addition, the SWm interface between ePDG and 3GPP AAA Server/Proxy 108 is used to support establishment of IPSec tunnels between the ePDG and UE in untrusted access implementations.

For establishment of PDN connections via TWAN 106, GTP control plane (GTP-C) and user plane (GTP-U) protocols are carried over the S2a interface directly toward the PGW 110. For untrusted WLAN access, this would occur over the S2b interface between ePDG and PGW 110.

In current implementations, the first level of cellular/WiFi user plane interworking can only occur in the PGW 110. Given the anticipated deployment of a large number of co-located small cell and WiFi access points, and the increased interest in access network sharing, the disclosed embodiments offer a standardized means, for example embodied in an intermediate gateway, for user plane interworking between small cell and WiFi access networks. Such capability may reduce the amount of signaling through the MCN (i.e., to the PGW 110).

TABLE 2

| | GTP-based WLAN solutions requirements | | | |
|---|---|---|---|---|
| | GAN/UMA (PS only) | I-WLAN | Untrusted WLAN | Trusted WLAN |
| Network Element | GANC | PDG/TTG | ePDG | TWAN |
| CN Interface | SGSN (or GGSN for Direct Tunnel support) | SGSN or GGSN | PGW | PGW |
| CN Protocols | GTP | GTP | GTP or PMIP | GTP or PMIP |
| UE Protocol | IKEv2/IPSec, EAP-AKA, Generic Access Radio Resource Control(GA-RRC), NAS protocols tunneled between UE and SGSN | IKEv2/IPSec, EAP-AKA | IKEv2/IPSec, EAP-AKA | EAP-AKA', WLAN Control Protocol (WLCP) defined for SaMOG Phase 2 |

Each of the above activities were intended to enable subscriber access to an operator's mobile core network via lower cost unlicensed 802.11 access points in lieu of expensive cellular base stations. Although operator adoption of GAN, I-WLAN, and Untrusted WLAN has been very limited, interest in Trusted WLAN is growing.

For 3GPP LTE access, GTP control plane signaling takes place within the S1-AP protocol over the S1-MME interface between the (H)eNB (i.e. 3GPP LTE Access Network 112) and MME 114. Note that in addition to GTP control plane signaling, the S1-AP protocol also encapsulates 3GPP non-access stratum (NAS) signaling between the UE 123 and MME 114 for authentication, EPC attachment, PDN connectivity, etc. When a UE 123 attempts to attach to the EPC 104 via an (H)eNB, the (H)eNB first selects an MME (e.g., based on PLMN ID, MME load, etc.) and forwards the attach request accordingly. The MME 114 uses subscription data from the HSS 126 to authenticate the UE 123. After successfully authenticating the UE 123, the MME 114 selects an SGW 116 (e.g., based on proximity to the The disclosed embodiments extend the SGW 116 to support this intermediate gateway functionality for mobility management improvements across MNO-deployed small cell and WiFi access networks (e.g., in urban metropolitan environments). Improvements may be realized by reducing user plane latency when inter-system mobility occurs in an integrated small cell/WiFi network environment. The disclosed embodiments may also improve scalability by reducing the PGW 110 burden for user plane handling in integrated small cell/WiFi environments. For instance, when transitioning between cellular and WiFi access within an ISW network, an enhanced SGW 116 as disclosed may act as a local mobility anchor across both access networks while maintaining the same tunnels toward the PGW 110. This eliminates the need to set up new tunnels between SGW/TWAN and PGW 110 when a UE 122 or 123 transitions across the different access points. The reduction in set-up and tear-down signaling may decrease latency and reduce the processing burden on the PGW 110 by distributing the workload to a larger number of serving gateways closer to the UE 122 or 123.

Moreover, by enabling the SGW 116 to anchor both WiFi and cellular flows the disclosed embodiments may support GTP-based IP flow mobility scenarios by allowing the UE 122 or 123 to provide a new "multi-connection" indication as a distinction from existing "initial attach" and "handover" indications.

Figure 2:
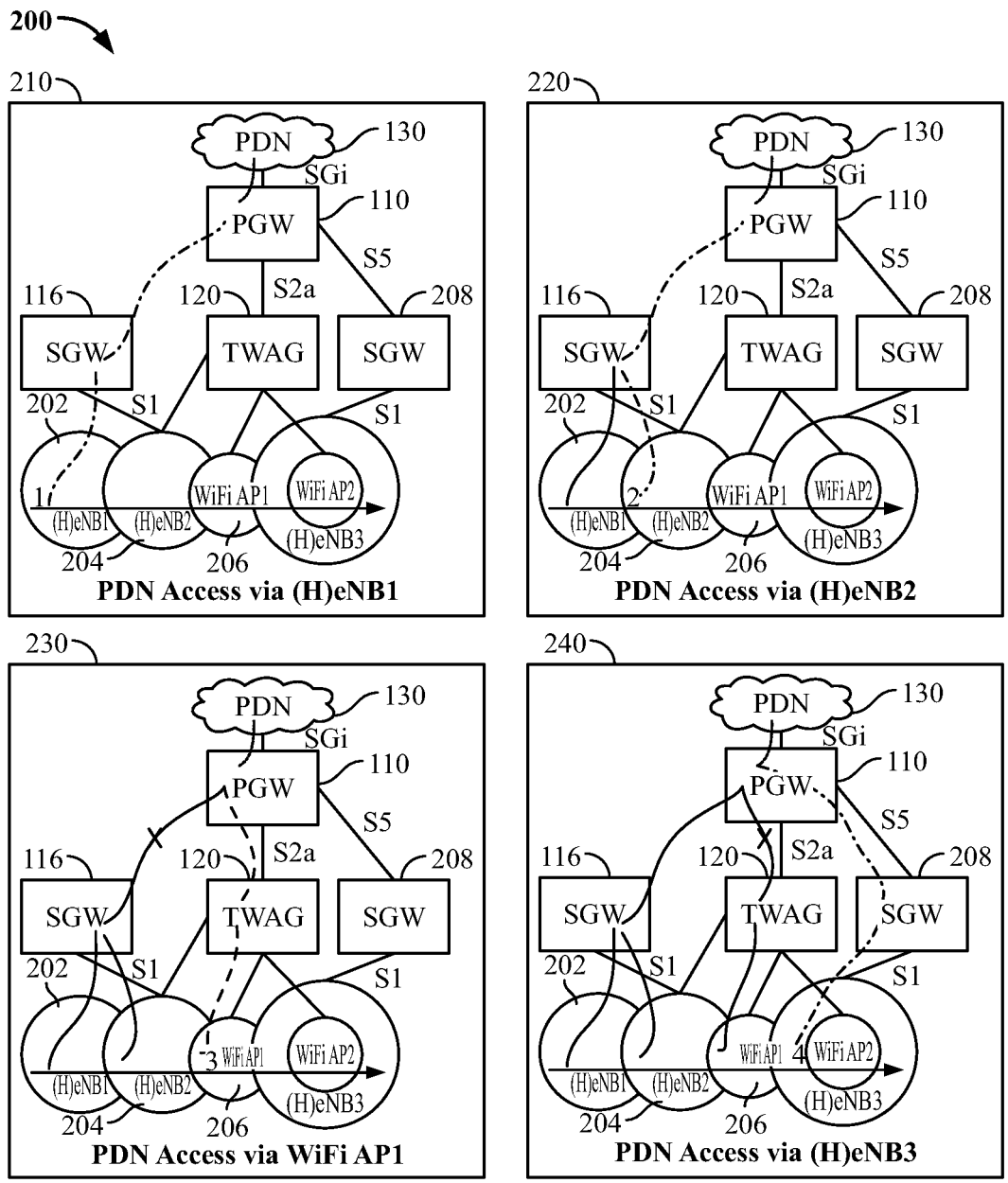
FIG. 2 illustrates scenarios that demonstrate the excessive tunnel setup and teardown required to support inter-system mobility via existing standards.

FIG. 2 illustrates scenarios 200 that demonstrate the excessive tunnel setup and teardown required to support inter-system mobility via existing standards. At scenario 210, a UE may be accessing a PDN 130 via a tunnel established between eNode-B 1 or Home eNode-B 1 ((H) eNB 1 202 in FIG. 2) and the PDN 130 traversing an SGW 116 using an S1 interface. The SGW may be using an S5 interface to communicate with the PGW 110, which uses the SGi interface to communicate with the PDN 130. This tunnel may be referred to as an S5 tunnel. At scenario 220, the UE may have moved, and may therefore be accessing the PDN 130 using the same S5 tunnel, but traversing eNode-B 2 or Home eNode-B 2 ((H)eNB 2 204 in FIG. 2) that routes the tunnel through the same SGW using an S1 interface. The SGW 116 is still using the same S5 interface to communicate with the PGW, which also still uses the SGi interface to communicate with the PDN. As shown in scenario 230, the UE further moves into a TWAN area serviced by a WiFi access point (WiFi AP 1 206 in FIG. 2) and a TWAG 120, the initial S5 tunnel is torn down and a new S2a tunnel is established to maintain connectivity for the UE, with the S2a tunnel traversing WiFi AP 1 and the TWAG, which communicated with the PGW using the S2a interface (hence this tunnel is referred to as the S2a tunnel). As shown in scenario 240, the UE further moves into the TWAN area, another S5 tunnel may be set up, while the S2a tunnel is torn down, between another SGW 208 within the TWAN area that communicates with the PGW 110 via the S5 interface. As one skilled in the art will recognize, this is a very resource intensive process, requiring the setup of at least three tunnels and associated tunnel teardowns.

Figure 3:
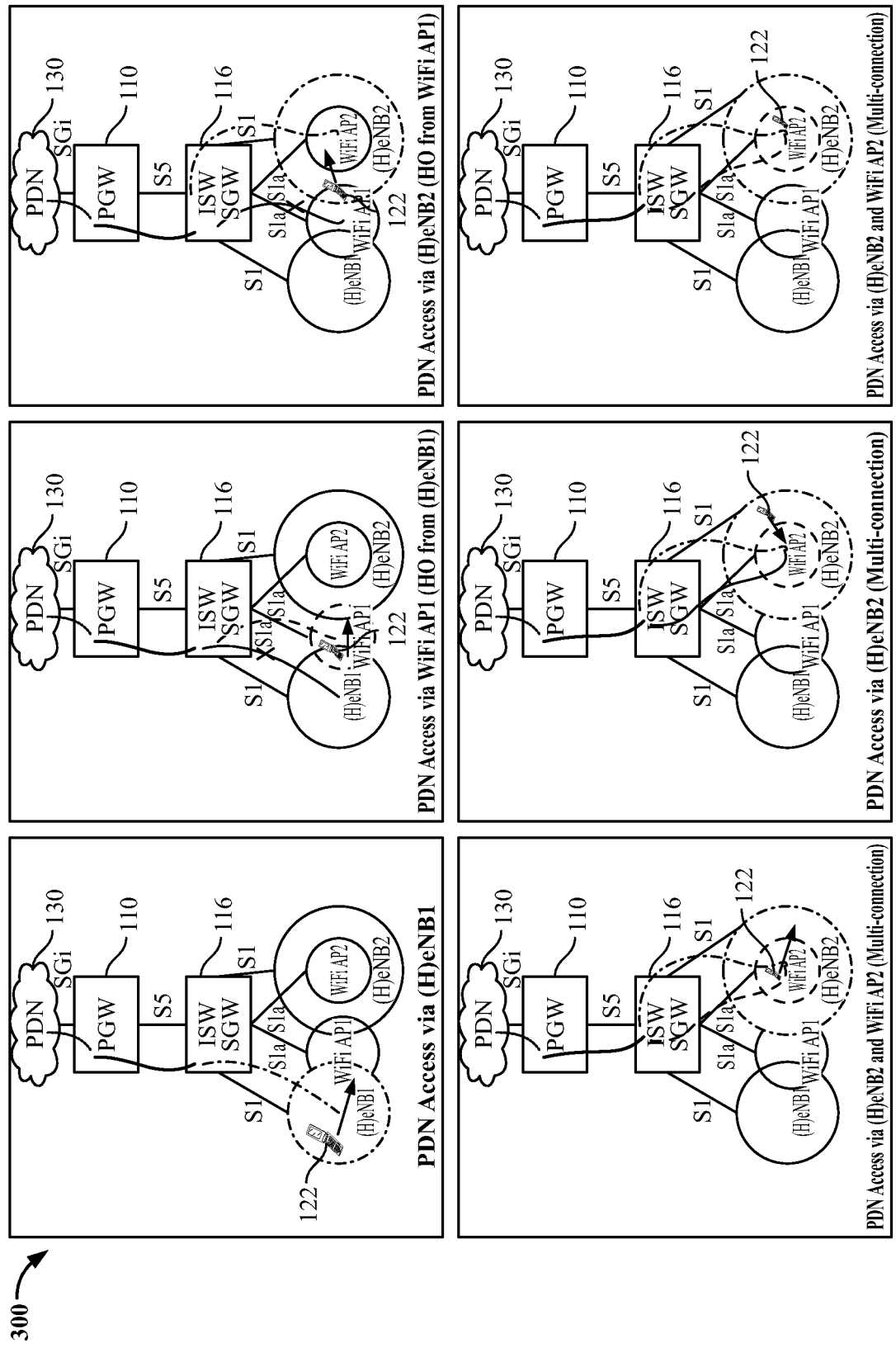
FIG. 3 shows the optimization scenarios that may be accomplished by extending the SGW to also support TWAN access according to the disclosed embodiments.

FIG. 3 shows the optimization scenarios that may be accomplished by extending the SGW 116 to also support TWAN 106 access according to the disclosed embodiments. As can be seen from this figure, and as described below in more detail, the presently disclosed embodiments allow the maintenance of a single GTP tunnel between a PGW 110 and an SGW 116 while a UE 122 moves between untrusted and trusted areas. In addition, additional scenarios may be enabled to support simultaneous cellular and WiFi access and dynamic IP flow mobility according to the disclosed embodiments. Such features may improve mobility robustness by eliminating the setup time associated with handover preparation (i.e., the alternate access routes are already in place).

As noted, the presently disclosed embodiments extend SGW 116 into a common intermediate gateway for both LTE and WiFi access. Separate authentication mechanisms for LTE and WiFi access may still be maintained as per existing standard procedures, i.e., LTE access via the MME 114 and WiFi access via the 3GPP AAA Server 108. As set forth in more detail herein, the disclosed embodiments provide for extension of the TWAN 106 and SGW 116 to support a new GTP-based user plane and control plane interface for TWAN bearers (e.g., "S1a"), extension of the STa interface to enable the exchange of additional ISW-based information between the 3GPP AAA Server 108 and the TWAN 106 (e.g., the SGW address), extension of the SWx interface to enable exchange of additional ISW-based information between the 3GPP AAA Server 108 and the HSS 126, extension of the S6a interface to enable exchange of additional ISW-based information between the HSS 126 and the MME 114, extension of the S6b interface to enable exchange of additional ISW-based information between the PGW 110 and the 3GPP AAA Server 108, and extension of NAS, EAP, and GTP-C protocols to enable additional features of the proposed architecture (e.g., indication of "multi-connection" PDN requests over LTE and TWAN 106 (as a distinction from standalone and inter-system handover connection requests)). The disclosed embodiments may enable GTP-based "IP flow mobility" support in the SGW 116 (and in the PGW 110). This "multi-connection" PDN request may be initiated based on user input (e.g., from a handset GUI, preferences file, etc.).

By enabling intra-SGW procedures for LTE/WiFi access, the disclosed embodiments may improve performance by executing inter-system mobility procedures closer to the edge of the network (i.e., to the SGW 116). Latency may be reduced by minimizing the need for executing mobility procedures deep in the core network (i.e., at the PGW 110). This may be especially beneficial when an MNO deploys both small cell and WiFi access in a common geographic area. Scalability may also be improved by reducing the burden on the PGW 110 by distributing some intersystem mobility functions to the SGWs 116.

By also introducing the intersystem "multi-connection" feature in the SGW 116, the disclosed embodiments may improve mobility robustness and reduce handover ping-ponging. By maintaining two connections when possible, one via LTE and one via WiFi, an alternate path is available without incurring handover setup signaling delays. This improves the user experience by reducing session interruptions when the primary data path is degraded. The "multi-connection" PDN capability may be initiated based on user input (e.g., from a handset GUI, preferences file, etc.). Note that this capability may also be extended to the PGW in some embodiments. Although 3GPP has already defined a PGW-based IP flow mobility solution using DSMIPv6, the disclosed embodiments support this functionality via GTP extensions, thereby eliminating the need for DSMIPv6 client support in the UE.

The 3GPP Release 12 SaMOG phase-2 can be used as the baseline solution for TWAN access. Although the SaMOG phase-2 solution supports single-PDN and multi-PDN UEs, the disclosed embodiments will mostly be based on the multi-PDN implementation since it introduces the GPRS Session Management (SM) based WLAN Control Protocol (WLCP) that may be extended to accommodate the disclosed intra-SGW handover and multi-access solutions. For the single-PDN case, the "TWAN Attach" and "Single PDN Connection" procedures may be accomplished via extended EAP signaling defined for SaMOG phase-2.

For the multi-PDN case, separate "TWAN Attach" and "PDN Connection" procedures can be used. As defined for SaMOG phase-2, the "attach" is still performed via extended EAP signaling, while the WLCP protocol is used to independently establish one or more PDN connections. Set forth herein are embodiments that enable the disclosed extended ISW-enabled SGW to facilitate a UE 122 attaching to EPC 104 via TWAN 106, possibly while already attached via 3GPP LTE access, a UE utilizing TWAN 106 for new PDN connection (including MAPCON if applicable), a UE 122 utilizing TWAN 106 for intra-SGW handover of LTE-based PDN connection(s), a UE 122 utilizing TWAN 106 for IP flow mobility across simultaneous LTE and WiFi connections, a UE 122 attaching to EPC 104 via LTE, possibly while already attached via TWAN 106, a UE 122 utilizing LTE for new PDN connection (including MAPCON if applicable), a UE 122 utilizing LTE for intra-SGW handover of TWAN-based PDN connection(s), and a UE 122 utilizing LTE for IP flow mobility across simultaneous WiFi and LTE connections.

A UE 122 may be provided with information for TWAN 106 discovery and selection, for example via pre-configuration, ANDSF policies, ANQP signaling, etc. When attaching via TWAN 106, a UE 122 may become aware of the TWAN's trust relationship with the EPC 104 using existing standard procedures, for example via pre-configuration or via authentication signaling with the 3GPP AAA Server 108.

Figure 4:
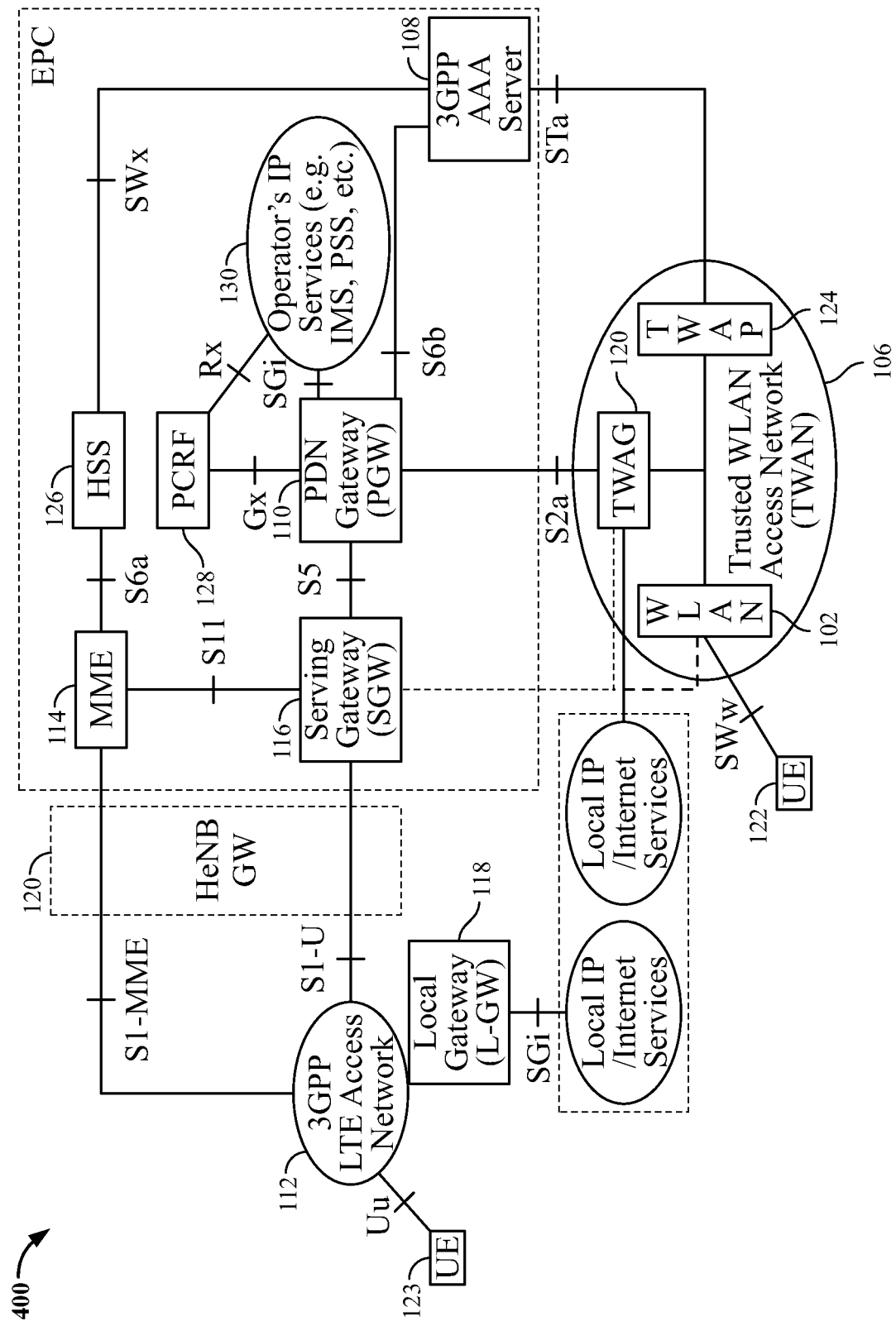
FIG. 4 is a diagram with illustrating an architecture with the new S1a interface shown as a dashed line and the modified STa interface shown between a TWAP and a 3GPP AAA Server as a solid line.

In an embodiment, a GTP-based "S1a" interface between the TWAN 106 and SGW 116 may be used. The S1a interface may carry GTP control signaling and user plane data (GTP-C and GTP-U). Current authentication and security procedures may still be used according to existing standard mechanisms over the STa, SWx, and S6b interfaces. In an embodiment, the STa interface may be expanded to carry additional information between the 3GPP AAA Server 108 and the TWAN 106 to enable the disclosed integrated SGW 116 proposal. This architecture is depicted in FIG. 4 with the new S1a interface shown as a dashed line and the modified STa interface shown between a TWAP 124 and a 3GPP AAA Server 108 as a solid line.

Depending on the embodiment implemented, the S1a interface may logically terminate in either the TWAG 120 or WLAN AN functions within the TWAN 106. The termination in WLAN AN is indicated by a dotted line. In the former case the TWAG 120 function acts as the peer entity processing the S1a protocols. In the latter case the WLAN AN function is the peer entity processing the S1a protocols.

When the S1a is terminated in the WLAN AN, some of the TWAG functionality may be absorbed by the SGW 116, thereby reducing the TWAG 120 functionality to that of a local gateway and/or DHCP server. In that case, the GTP-C protocols for the S1a interface may be extended to provide additional information to the SGW from the TWAP 124 via the WLAN AN, i.e., information that would normally have been conveyed internally between the TWAP 124 and TWAG 120 (e.g., UE MAC address, VLAN ID, etc.). From an architectural perspective, this configuration may make the S1a interface more analogous to the LTE S1 interface since it terminates within a radio access network, i.e., the WLAN AN. Termination in the TWAG 120 is more analogous to the S2a interface since it terminates in a gateway, i.e., the TWAG 120.

When the S1a interface terminates in the TWAG 120, the TWAG 120 may perform similar functions as the HeNB GW in LTE access networks, e.g., concentrate the signaling toward the EPC 104. However, in the case of HeNB GW, the S1-AP may include GTP and UE NAS-related signaling towards the MME 114. In the case of the TWAG 120, the S1a protocols may be limited to GTP signaling toward the SGW 116.

In the disclosed exemplary embodiments, the S1a may terminate in the TWAG 120. Based on the architectural and protocol extensions described in this disclosure, additional examples for the case of S1a termination in the WLAN AN may be developed by those skilled in the art.

Note that although FIG. 4 shows the case of a non-roaming architecture, the disclosed solution also applies to the case of roaming with home-routed services. In that case, a 3GPP AAA Proxy exists in the path between the TWAN 106 and 3GPP AAA Server 108 and the SGW 116 resides in the visited PLMN.

[The TWAN 106 may utilize either the S1a or S2a interface for a particular UE-PDN connection as instructed by the enhanced 3GPP AAA Server 108. In most embodiments, the TWAN 106 may not simultaneously support use of both the S1a and S2a interfaces for the same PDN 130 connection from a single UE 122.

New bearer procedures are described using extended GTP-C and GTP-U protocols on the new S1a interface, along with additional functionality defined for the TWAN 106, 3GPP AAA Server/Proxy 108, and SGW 116, and to lesser extent for the PGW 110, HSS 126, MME 114 and PCRF 128.

Although the disclosed embodiments apply to both WiFi-only and integrated small cell/WiFi (ISW) networks, the disclosed embodiments may be most advantageous in the ISW network case where the SGW 116 can become a "mobility anchor" for both cellular and WiFi bearers. These embodiments may enable optimized solutions for GTP-based intersystem (cellular/WiFi) user mobility and intersystem IP flow mobility at the SGW. By moving this functionality closer to the network edge, a more scalable network can be deployed with lower latencies than with the current standard PGW-anchored approach.

In an embodiment, the 3GPP AAA Server/Proxy 108 may become aware of the TWAN's ISW network capabilities via new signaling information from the TWAN 106 over the STa interface. For instance, the "Access Type" information element in the STa "Access Authentication and Authorization Request" may be extended to include ISWs for the case where the TWAN 106 supports the SGW 116 interworking capability set forth in this disclosure.

In an embodiment, the 3GPP AAA Server/Proxy 108 may determine SGW 116 candidates with corresponding ISW networking capabilities and provide this SGW selection information (FQDN/IP Addresses) to the TWAN 106 via new signaling over the STa interface. Such information may be configured in the 3GPP AAA Server 108. Additionally, this information may be dynamically updated. For instance, the HSS may be updated via MME 114 and 3GPP AAA Server 108 each time a PDN connection is established or released with a UE. This information can be provided to the 3GPP AAA Server 108 via the SWx interface such that it can update its internal database.

In embodiments using S2a-S8 PMIP-based chaining, on receipt of the authentication and authorization answer that completes a successful authentication, the 3GPP AAA Proxy may check locally configured information about using the chained option towards the given HPLMN. If chaining is required, the 3GPP AAA Proxy may select a Serving GW 116 from its network configuration database and may include the Serving GW address in the response. The S8 is the roaming interface between the SGW 116 and PGW 110. In principle S5 and S8 is the same interface, the difference being that S8 is used when roaming between different operators while S5 is network internal.

Chained S2a and S8 may be used when a VPLMN has a business relationship with non-3GPP networks and SGW 116 in VPLMN may include local non-3GPP anchor (i.e., LMA for PMIPv6-based S2a).

In this disclosure embodiments are disclosed to extend the non-3GPP TWAN 106 functionality to enable GTP access to the SGW 116 for both the roaming and non-roaming cases. Based on considerations such as TWAN 106 capabilities, UE connection status, known network topology, etc., the 3GPP AAA server 108 may determine if the TWAN 106 connection should be established directly over the existing S2a interface with the PGW 110 per legacy procedures, or via an SGW 116 per new procedures over the proposed S1a interface.

For instance, the HSS 126 may be updated with the latest UE connectivity information, e.g., SGW address, PGW address, etc. When the UE 122 attempts to attach via TWAN 106, the 3GPP AAA server 108 may retrieve the latest UE subscription and connection information. If the UE 122 is already connected to an SGW 116 via LTE access, the same SGW may be assigned for use via the TWAN 106 access. Also, if the UE 122 is in the vicinity of LTE and TWAN 106 access points capable of sharing the same SGW 116, this ISW-enabled SGW 116 may be assigned.

If the S1a interface is selected, the TWAN 106 may use the SGW 116 and PGW 110 information to establish a PDN connection from the TWAN 106 to the PGW 110 via the SGW 116. To accomplish this, a new GTP-based signaling between the TWAN 106 and SGW 116 via the newly proposed "S1a" interface may be used as described below.

The SGW 116 functionality may be extended to process the new information elements provided in the extended GTP-C protocols over the S1a interface. When the Sla interface terminates in the WLAN AN function of the TWAN 106, the SGW 116 may support some of the TWAG 120 functionality. As such, it may process any new information elements from the extended GTP-C signaling (e.g., UE MAC address, VLAN ID) in order to facilitate routing of packets between the PGW 110 and UE 122.

Where the reason for the session request signaled by the extended GTP-C signaling includes the disclosed multi-connection indication, the SGW 116 may perform IP flow mobility procedures. For instance, the SGW 116 policy may be configured to send downlink packets via the same access for which the corresponding uplink packets were received. In this case the SGW 116 may associate the 5-tuple for each uplink packet flow with the access network on which they were received (e.g., LTE or WiFi), and send the corresponding downlink packets via the same access. The 5-tuple consists of the source IP address, source port number, destination IP address, destination port number, and transport protocol type (e.g., UDP, TCP). For example, if previous uplink UDP packets with source IP address="a", source port number="b", destination IP address="x", and destination port number="y" were received via WiFi, subsequent downlink UDP packets with source IP address="x", source port number="y", destination IP address="a", and destination port number="b" will also be sent via WiFi. Alternatively, the downlink packets may be sent via any available access independently from uplink packets.

When a PDN 130 connection is established, the PGW 110 may know the corresponding SGW 116 address. The PGW 110 may inform the AAA server 108 of the PGW 110 and SGW 116 addresses via the S6b interface. The 3GPP AAA Server 108 may subsequently update the HSS 126 with this information over the SWx interface.

Where the reason for the session request signaled by the extended GTP-C signaling includes the disclosed multi-connection indication, the PGW 110 may perform IP flow mobility procedures. When multi-connection IP flow mobility is supported by the PGW 110, the PGW 110 policy may be configured to send downlink packets via the same access for which the corresponding uplink packets were received. In this case the PGW 110 may associate the 5-tuple for each uplink packet with the access network on which they were received (LTE or WiFi) and send the corresponding downlink packets via the same access. For instance, if previous uplink UDP packets with source IP address="a", source port number="b", destination IP address="x", and destination port number="y" were received via WiFi, subsequent downlink UDP packets with source IP address="x", source port number="y", destination IP address="a", and destination port number="b" will also be sent via WiFi. Alternatively, the downlink packets may be sent via any available access independently from uplink packets.

A disclosed extension to existing protocols may include providing candidate SGW 116 addresses to the TWAN 106. Other disclosed extensions may include providing indications for multi-access connectivity for the same UE-PDN connection. This latter multi-access connectivity feature may allow a UE 122 to request PDN 110 connectivity via simultaneous access over both cellular and WiFi. In order to support this feature, the UE 122 may be assigned the same IP address for routing of packets to and from the PDN 130 via either access. This may be accomplished by adding a multi-access connection indicator to the EAP, NAS, and GTP protocols. Note that while examples are provided herein for use of the S1a interface for an ISW-enabled SGW, the disclosed multi-access connection protocol extension may also be used when the legacy S2a connection to PGW is employed. Use of these protocol extensions are illustrated further detail below.

In an embodiment, EAP signaling may be extended to allow the TWAN 106 to indicate its expanded capabilities to the 3GPP AAA server 108. For instance, the access type information element may be extended to include "ISW-enabled TWAN" as one of the potential access types. A new Diameter AVP, e.g., "GTP ISW info", may be defined to provide the Serving GW address information element. For the intersystem handover embodiments in the single-PDN scenario, the extended EAP signaling described for SaMOG phase-2 already supports use of the handover indication along with the APN for the PDN 130 connection to be handed over. For the case of intersystem multi-connection, a new indicator may be defined for multi-connection along with providing the APN for the PDN connection.

The NAS Session Management (SM) protocol may be the starting point for the WLCP protocol design. Activate PDP Context Request/Accept/Reject and Deactivate PDP Context Request/Accept may be used.

For LTE access, a new indicator for multi-connection may be used according to the disclosed embodiments. When the UE 122 has an existing PDN connection via TWAN 106, it may request a multi-access connection via extensions to the LTE attach procedure. In addition to the initial attach and handover indication, in an embodiment, the multi-connection indication may be used.

Where the S1a interface terminates in the WLAN AN function of the TWAN 106, additional information such as UE MAC address and VLAN ID may be conveyed via the GTPv2-C signaling to the SGW 116. The indication flags in the GTP-C "Create Session Request" may also be expanded to include a value for multi-connection in addition to the existing handover indication.

The following message sequences are intended to illustrate examples enabled by the architecture and protocol extensions described herein. Based on these extensions, other applicable examples may also be implemented by those skilled in the art. For example, for single-PDN scenario, the initial attach embodiments are described herein, and additional embodiments are described for the multi-PDN scenario. However, the handover and multi-connection embodiments described for the multi-PDN scenario may also be applied to single-PDN implementations. While the following examples use the Sla interface terminating in the TWAG function 120 of the TWAN 106, similar applicable procedures with GTP-C extensions may also be used for the case where S1a terminates in the WLAN AN function of the TWAN 106. All such embodiments are contemplated as within the scope of the present disclosure.

Set forth below are exemplary message sequences employing the disclosed extended ISW-enabled SGW 116, including sequences that address scenarios where the UE 122 attaches to EPC 104 via TWAN 106, possibly while already attached via 3GPP LTE access, where the UE 122 utilizes TWAN 106 for a new PDN connection (includes MAPCON if applicable, note that this embodiment specifically addresses the scenario where the UE 122 only supports a single-PDN connection via TWAN), where the UE 122 utilizes TWAN 106 for a new PDN connection (includes MAPCON if applicable, however, this embodiment specifically addresses the case where the UE 122 supports multiple PDN connections via TWAN), where the UE 122 utilizes TWAN 106 for intra-SGW handover of LTE-based PDN connection(s) (this embodiment addresses the scenario where the UE 122 supports multiple PDN connections via TWAN 106), and where the UE 122 utilizes TWAN 106 for IP flow mobility across simultaneous LTE and WiFi connections (here again, this embodiment addresses the scenario where the UE 122 supports multiple PDN connections via TWAN 106.)

Set forth below are further exemplary message sequences employing the disclosed extended ISW-enabled SGW, including sequences that address scenarios where the UE 122 attaches to EPC 104 via LTE, possibly while already attached via TWAN 106, where the UE 122 utilizes LTE for a new PDN connection (includes MAPCON if applicable; since initial attachment via LTE is a well-understood procedure, only a brief description is provided), where the UE 122 utilizes LTE for intra-SGW handover of TWAN-based PDN connection(s), and where the UE 122 utilizes LTE for IP flow mobility across simultaneous WiFi and LTE connections.

As noted, the 3GPP Release 12 SaMOG phase-2 solution is used herein as the baseline for the procedures described in this section. The disclosed embodiments may be implemented with both single-PDN and multi-PDN connection cases as defined by the current SaMOG phase-2 solution. For the multi-PDN connection case, separate "attach" and "PDN connection establishment" procedures are described. Namely, the "attach" procedures (attach, detach) are performed via extended EAP signaling while the "PDN connection" procedures (activation, deactivation) are performed by the new SaMOG phase-2 WLAN Control Protocol (WLCP). In addition to discovering support for SaMOG phase-2 capabilities (concurrent multiple PDN connections, IP address preservation, concurrent NSWO and EPC 104 access), the disclosed embodiments enable the UE 122, TWAN 106, and 3GPP AAA server 108 to indicate support for establishing TWAN PDN connections via ISW-enabled SGWs 116. This may be accomplished via extensions to the EAP.

A UE 122 may attach via TWAN 106 to establish a single PDN connection, possibly while already attached via 3GPP LTE access. If already attached via LTE, this scenario may be considered an example of MAPCON, or multiple access PDN connectivity. The procedure is initiated via EAP extensions per the current SaMOG phase-2 single-PDN connection solution. In this embodiment, the attach procedure is combined with establishment of a PDN connection to the UE-specified APN, or to the default APN if none was specified by the UE 122.

The disclosed embodiments include the use of an ISW-enabled SGW for TWAN 106 access toward the PDN 130. The 3GPP AAA server 108 may be configured to provide the TWAN 106 with the address of an ISW-enabled SGW 116 that can also be shared for LTE access. In ISW environments a UE 122 may have access to many small cell and WiFi access points. Anchoring the UE 122 on a common SGW 116 may provide benefits when the UE 122 requests a handover or an inter-system multi-connection to the same PDN 130.

It is understood that the functionality illustrated in FIG. 4 may be implemented in the form of software (i.e., computer-executable instructions) stored in a memory of, and executing on a processor of, a node of an M2M network (e.g., a server, gateway, device, or other computer system), such as one of those illustrated in FIG. 12C or 12D described below.

Figure 5A:
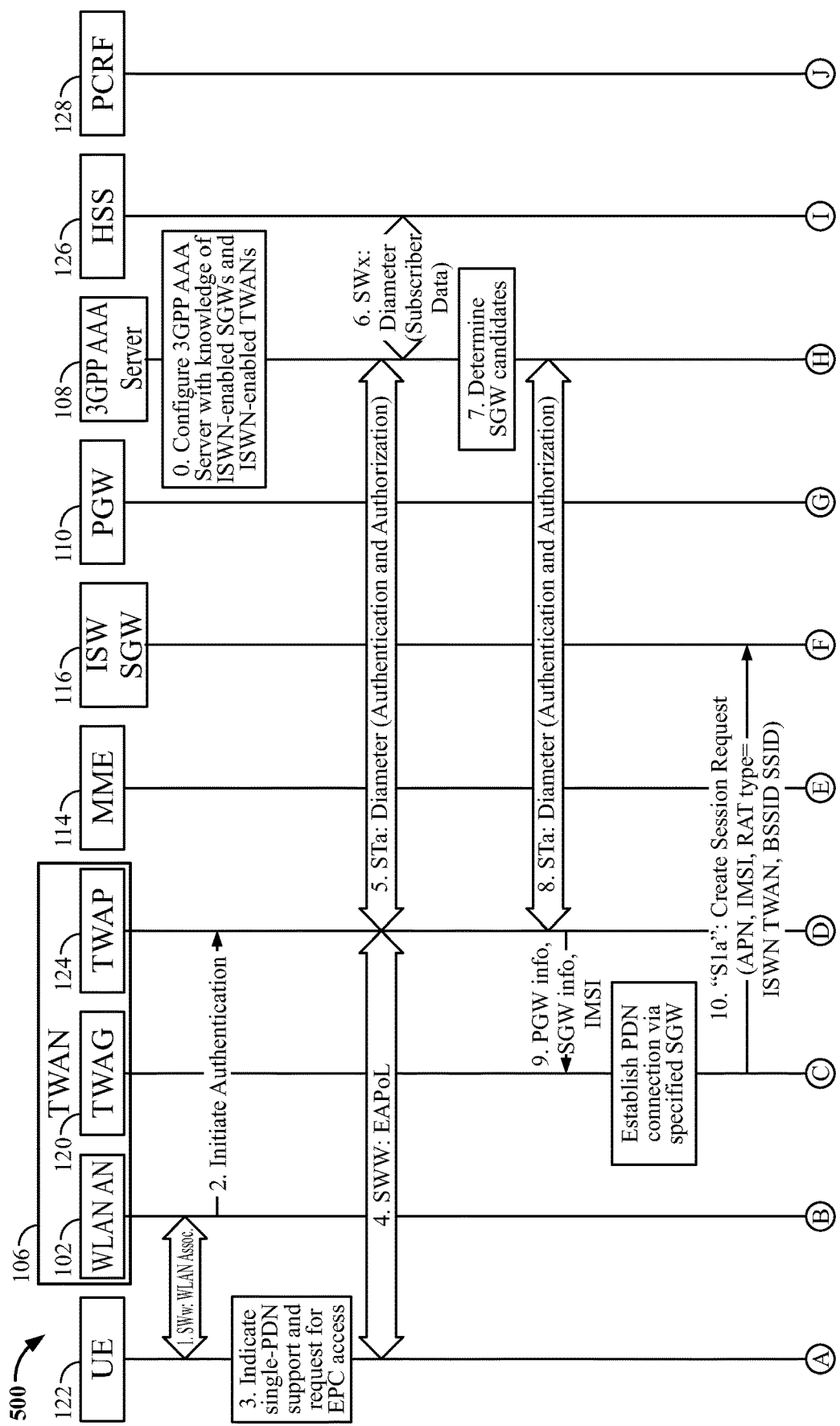
FIG. 5A-B is a flow diagram that illustrates an exemplary initial TWAN attach with single-PDN capability signal flow using a new S1a interface according to an embodiment.
Figure 5B:
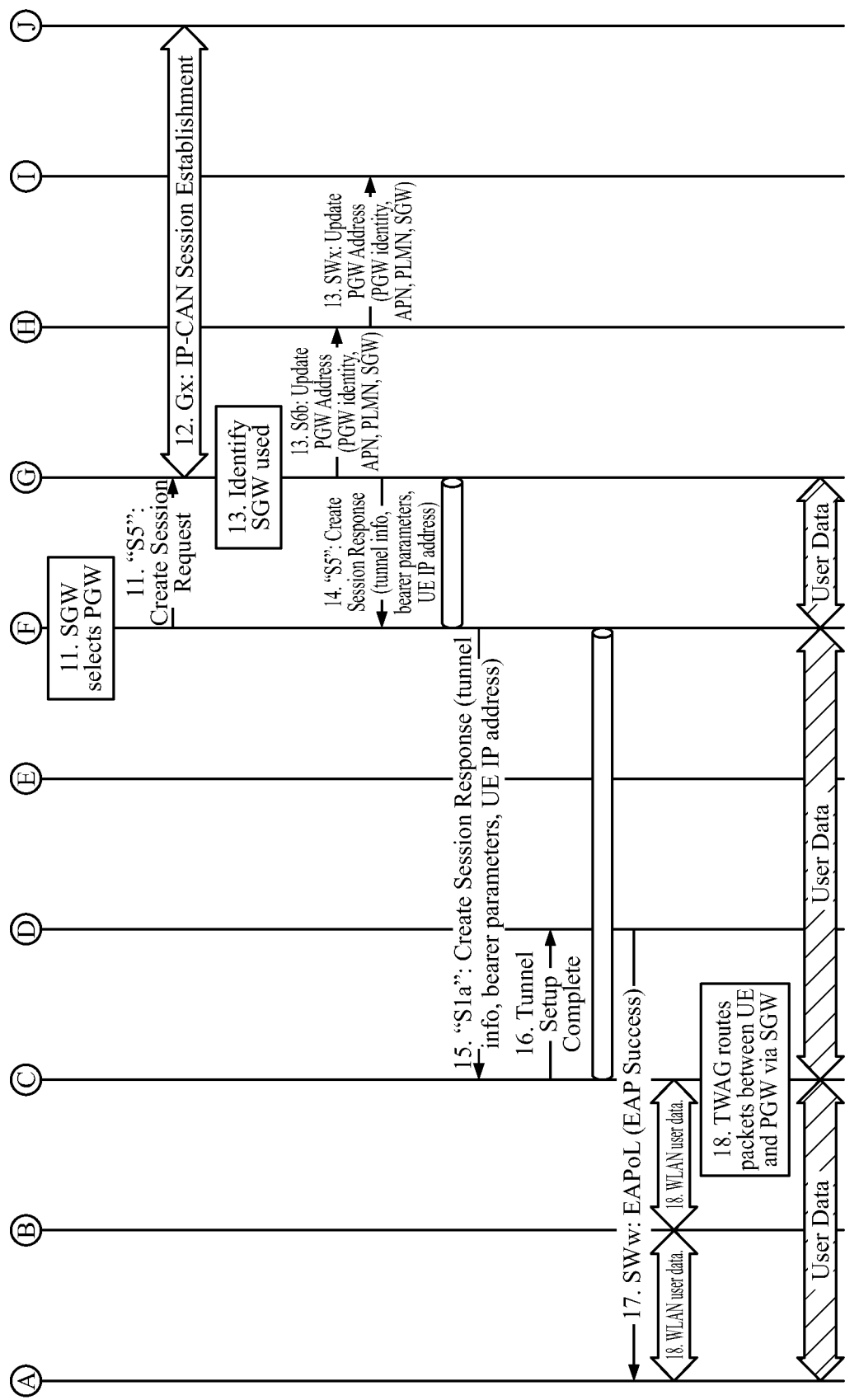

FIG. 5A-B is a flow diagram that illustrates an exemplary initial TWAN 106 attach with single-PDN capability signal flow 500 using a new S1a interface according to an embodiment. In this description of signal flow 500, it is assumed that the 3GPP AAA server 108 maintains information about the ISW-enabled SGWs 116 and ISW-enabled TWANs 106. At step 1 of FIG. 5, a UE associates to a WiFi access point (AP) that is part of an operator's trusted WLAN Access Network (TWAN) 106. Association may occur via standard IEEE 802.11 procedures via the SWw interface. The UE 122 may discover and attempt association with this WiFi AP based on pre-configured information, ANDSF policies, ANQP signaling, etc. If the UE 122 already has an ongoing PDN connection via LTE access, this may be considered a case of MAPCON, i.e., simultaneous use of cellular and WiFi access for PDN connectivity.

At step 2 of FIG. 5A, an internal message triggered by the WLAN AN 102 within the TWAN may initiate the authentication procedure via the Trusted WLAN AAA Proxy (TWAP). At step 3 of FIG. 5A, the UE 122 may determine the type of connection it wants to request based on its capabilities. In this example, initiation of the SaMOG phase-2 single-PDN connection case is assumed. At step 4 of FIG. 5A, the TWAP 126 retrieves identity information from the UE 122 via standard EAPoL procedures over the SWw interface. At step 5 of FIG. 5A, the TWAP 126 sends the Diameter-EAP-Request to the 3GPP AAA server 108 over the STa interface (including mandatory information elements for User Identity, EAP Payload, Authentication Request Type, UE Layer 2 Address, Access Type, and Access Network Identity), conditional information elements for Mobility Capabilities, and optional information elements for Terminal Information and WLAN Identifier. In this example embodiment, the EAP Payload may contain an indication of the UE's single-PDN support per the SaMOG phase-2 solution. The values for Access Type may be extended to include "ISW-WLAN" for the case where the TWAN 106 supports integration with 3GPP access as described in this disclosure. Definition of the Access Network Identifier may also be extended to allow inclusion of the value "ISW-WLAN" as the Access Network ID (ANID) Prefix. The optional Terminal Information element may be extended to include additional information about the UE's ISW capability. This may not be necessary if all the relevant UE capability information is exchanged via extensions to the EAP payload.

At step 6 of FIG. 5, if the 3GPP AAA server 108 requires additional information about the subscriber including previous connectivity status, it retrieves this information from the HSS 126 using the Diameter protocol on the SWx interface. At step 7 of FIG. 5A, based on knowledge of ISW-enabled SGWs 116 and TWAN 106 information provided by the proposed extensions in this disclosure, the 3GPP AAA server 108 identifies ISW-enabled SGW 116 candidates in the vicinity of the ISW-enabled TWAN 106. At step 8 of FIG. 5A, the 3GPP AAA Server 108 sends the Diameter-EAP-Answer to the TWAP 126 over the STa interface including the SGW Address. At step 9 of FIG. 5A, the TWAP 126 sends an internal message to the Trusted WLAN Access Gateway (TWAG) 120 informing it to set up a GTP tunnel with the selected SGW 116 as part of the PDN connection. At step 10 of FIG. 5A, the TWAG 120 sends a GTP-C Create Session Request message to the selected SGW 116 over the newly proposed S1a interface. The message may include APN, IMSI, RAT type (e.g., ISW-WLAN), BSSID, SSID, etc. At step 11 of FIG. 5B, the SGW 116 may use this information to select the PGW 110. The SGW 116 may then send a GTP-C Create Session Request message to the selected PGW 110 over the S5 interface.

At step 12 of FIG. 5B, if dynamic policy and charging control (PCC) is implemented, the PGW 110 indicates the session establishment to the Policy and Charging Rules Function (PCRF) 128 in order to retrieve the QoS and charging rules. The PGW 110 may then enforce these rules. If dynamic PCC is not implemented, such rules may be preconfigured in the PGW 110. At step 13 of FIG. 5B, the PGW 110 may use the S6b interface to update the 3GPP AAA server with 108 the associated PGW connectivity information for the UE 122. In addition, it may also provide the associated SGW information. The 3GPP AAA server 108 may subsequently updates the Home Subscriber System (HSS) 126 with this information via the SWx interface. At step 14 of FIG. 5B, the PGW 110 sends the GTP-C Create Session Response message to the SGW 116 over the S5 interface including GTP tunnel information, bearer parameters, and the allocated UE IP address. The GTP tunnel between the PGW and SGW 116 is then established.

At step 15 of FIG. 5B, the SGW 116 may send the GTP-C Create Session Response message to the TWAG 120 over the disclosed S1a interface. The message may include GTP tunnel information, bearer parameters, and the allocated UE IP address. At step 16 of FIG. 5B, the TWAG 120 may send an internal message to the TWAP 126 informing it that the S1a bearer has been successfully established. At step 17, the TWAP 126 may indicate completion of the attach procedure to the UE 122 via the EAP Success indication in the EAPoL message over the SWw interface. At step 18 of FIG. 5B, the UE 122 may negotiate its IPv4 address with the TWAG 120 via DHCPv4. The TWAG 120 provides the UE 122 with its IP address as previously delivered in the GTP-C Create Session Response. The TWAG 120 routes packets between UE 122 and PGW 110 via SGW 116.

In the initial TWAN attach with multi-PDN connection capability scenario, the UE 122 may attach via TWAN 106 to establish a PDN connection, possibly while already attached via 3GPP LTE access network. If already attached via LTE, this scenario may be considered an example of MAPCON, or multiple access PDN connectivity. The example set forth below, where the UE 122 requests EPC access via TWAN 106, assumes the SaMOG phase-2 multi-connection scenario. In this case the scenario consists of two separate procedures, one for the initial attach using EAP extensions and one for subsequent PDN connection(s) using the new SaMOG phase-2 WLAN Control Protocol (WLCP).

The example procedure described involves the use of an ISW-enabled SGW 116 for TWAN 106 access to a PDN 130 according to embodiments set forth herein. The 3GPP AAA server 108 is enabled to provide the TWAN 106 with the address of an ISW-enabled SGW 116 that can also be shared for LTE access. In ISW environments a UE 122 may have access to many small cell and WiFi access points. Anchoring the UE 122 on a common SGW 116 can provide benefits when the UE 122 requests a handover or an inter-system multi-connection to the same PDN 130.

Figure 12A:
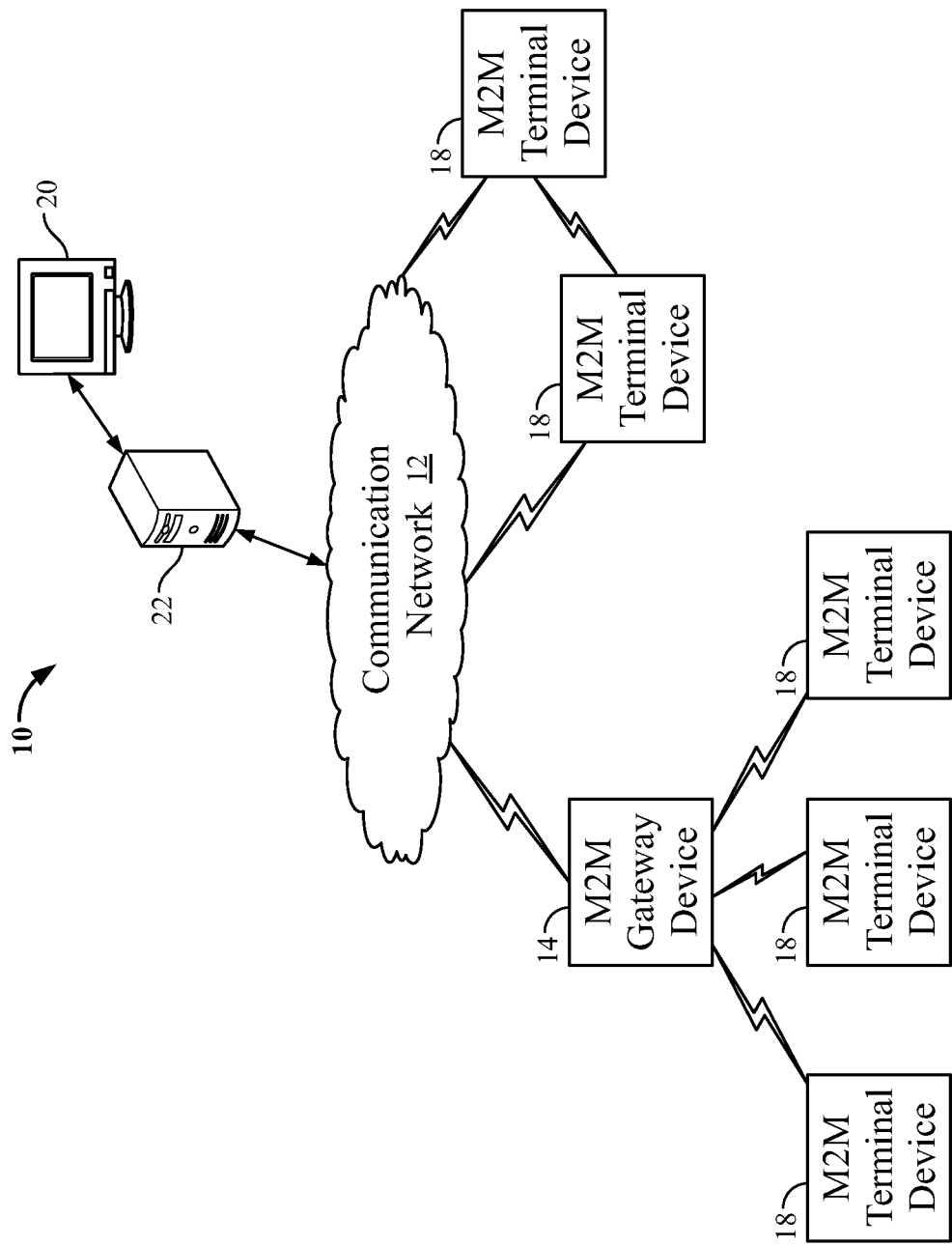
FIG. 12A is a diagram of an example machine-to machine (M2M) or Internet of Things (IoT) communication system in which one or more disclosed embodiments of IoT event management systems and methods may be implemented.
Figure 12B:
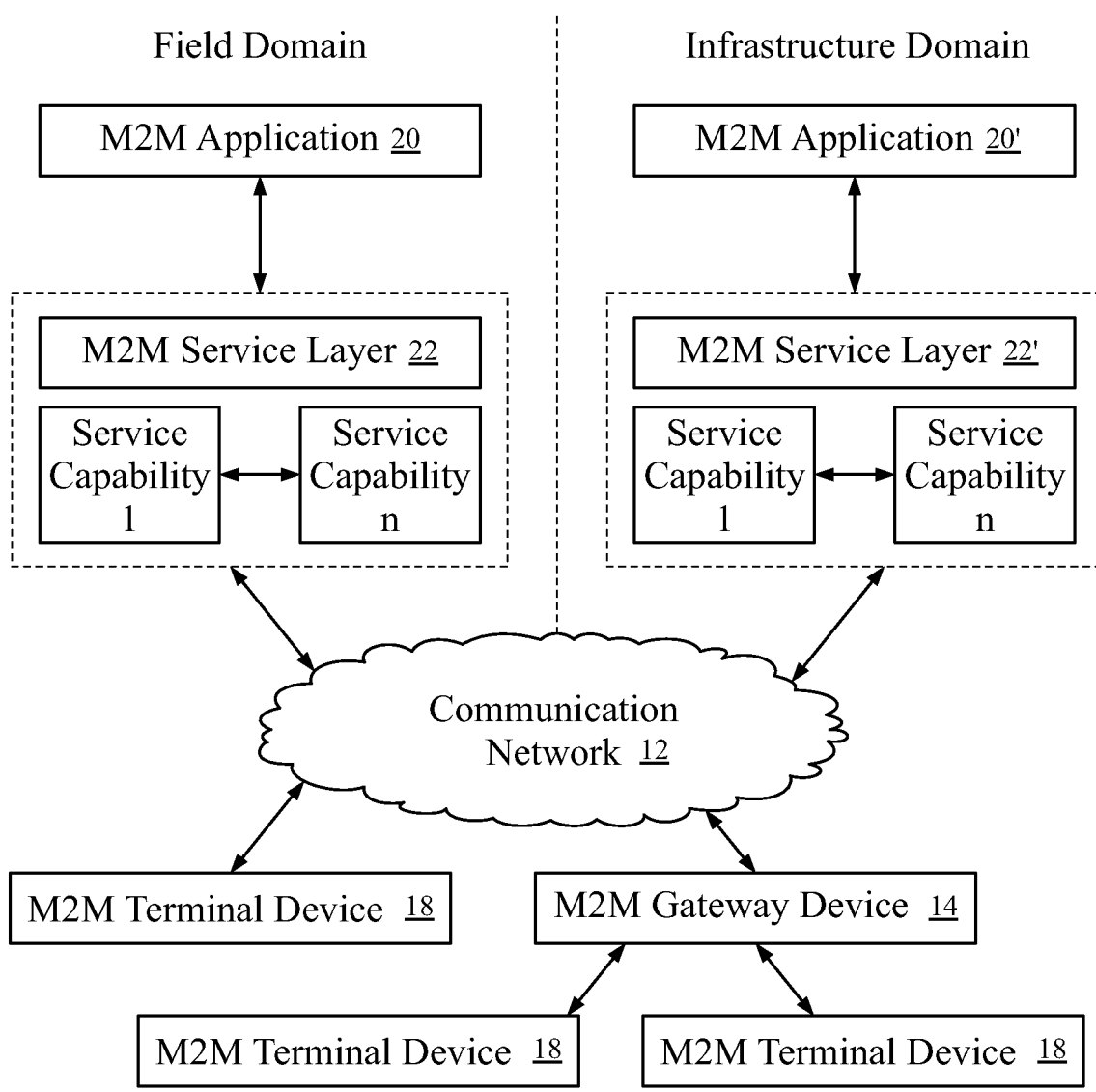
FIG. 12B is a system diagram of an example architecture that may be used within the M2M/IoT communications system illustrated in FIG. 12A.

It is understood that the entities performing the steps illustrated in FIG. 5A-B may be logical entities that may be implemented in the form of software (i.e., computer-executable instructions) stored in a memory of, and executing on a processor of, a device, server, or other computer system such as one of those illustrated in FIG. 12A or 12B. That is, the method(s) illustrated in FIG. 5A-B may be implemented in the form of software (i.e., computer-executable instructions) stored in a memory of a computing device, such as for example the device or computer system illustrated in FIG. 12A or 12B, which computer executable instructions, when executed by a processor of the computing device, perform the steps illustrated in FIG. 5A-B. It is also understood that any transmitting and receiving steps illustrated in FIG. 5A-B may be performed by communication circuitry of the node under control of the processor of the node and the computer-executable instructions (e.g., software) that it executes.

Figure 6A:
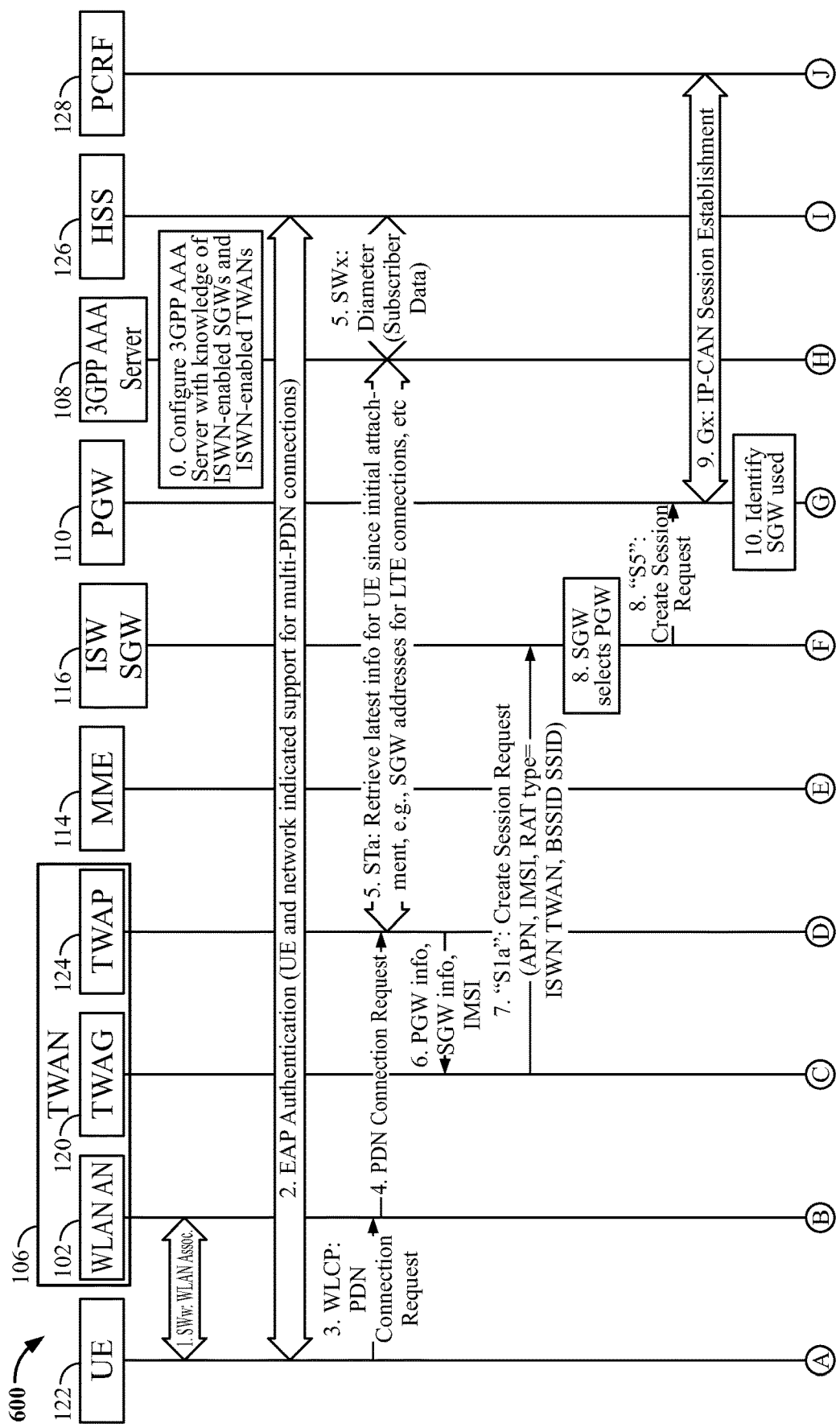
FIG. 6A-B is a flow diagram that illustrates exemplary initial TWAN attach with multi-PDN capability signal flow according to an embodiment.
Figure 6B:
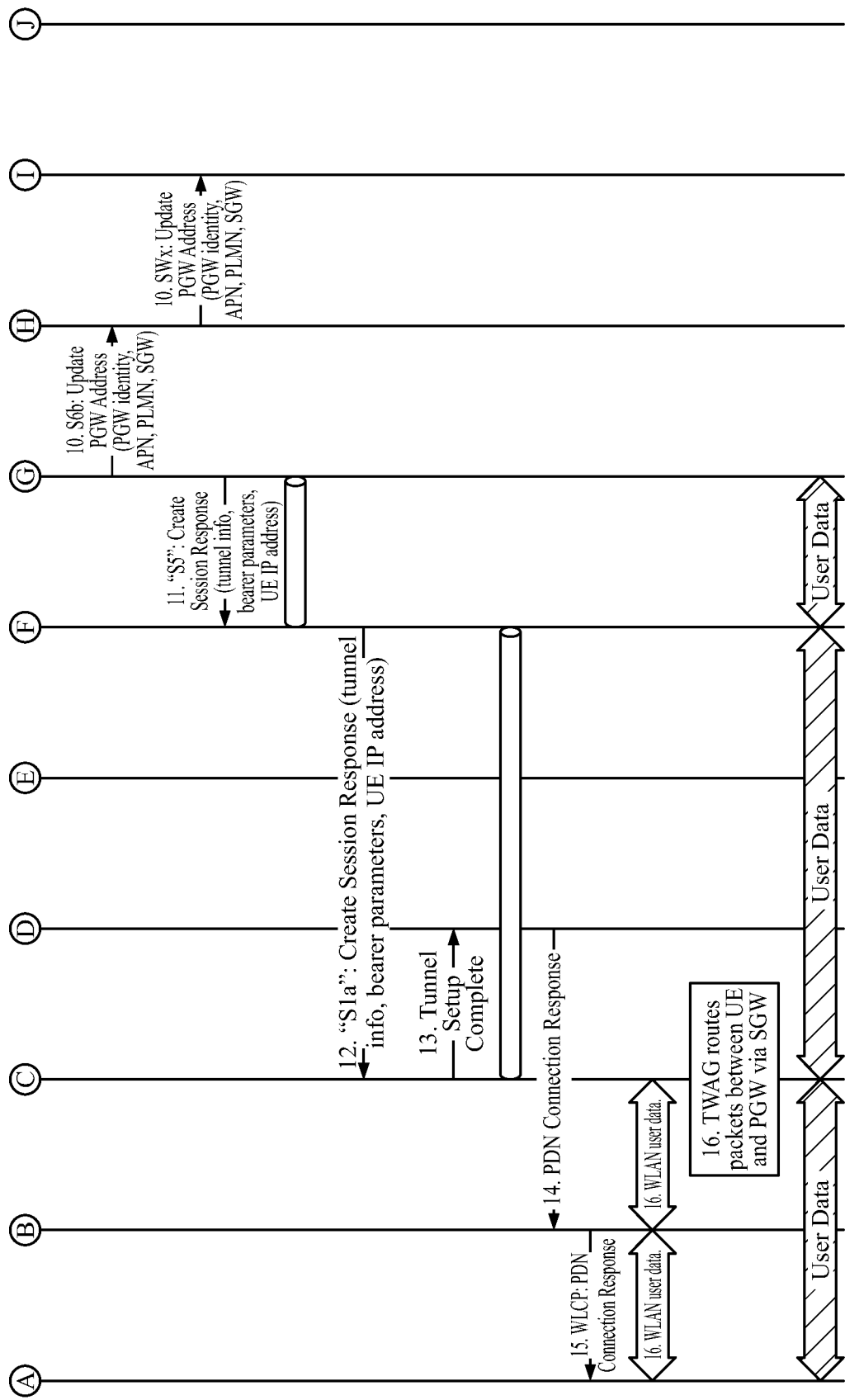

FIG. 6A-B illustrates exemplary initial TWAN 106 attach with multi-PDN capability signal flow 600 according to an embodiment. In this description of signal flow 600, it is assumed that the 3GPP AAA server 108 maintains information about the ISW-enabled SGWs and ISW-enabled TWANs 106. At step 1 of FIG. 6A, a UE 122 associates to a WiFi AP that is part of an operator's TWAN. Association may occur via standard IEEE 802.11 procedures using the SWw interface. The UE 122 may discover and attempt association with this WiFi AP based on pre-configured information, ANDSF policies, ANQP signaling, etc. Where the UE 122 already has an ongoing PDN connection via LTE access, this may be considered a case of MAPCON, i.e., simultaneous use of cellular and WiFi access for PDN connectivity.

At step 2 of FIG. 6A, EAP authentication may be performed, in some embodiments similar to that performed in blocks 2-8 of FIG. 5A, except in the embodiment of FIG. 6A the EAP payload may contain an indication of the UE's multi-PDN TWAN capability as per the SaMOG phase-2 solution. At step 3 of FIG. 6A, the UE 122 subsequently requests a PDN Connection via the SaMOG phase-2 WLAN Control Protocol (WLCP). In this example, it is assumed that the UE 122 requests connection to a PDN to which it is not currently connected. At step 4 of FIG. 6A, the WLAN AN function in the TWAN forwards the PDN Connection Request to the TWAP 126.

At step 5 of FIG. 6A, the TWAP 126 communicates with the 3GPP AAA Server over the STa interface to retrieve the latest information for the subscribed UE. If the 3GPP AAA Server 108 requires additional information about the subscriber including previous connectivity status, it retrieves this information from the HSS 126 using the Diameter protocol on the SWx interface. In one example it identifies an ISW-enabled SGW 116 to be used as an intermediate gateway. Where the UE 122 already has PDN connectivity via LTE, the 3GPP AAA server 108 may indicate the same SGW 116 if the SGW 116 is an ISW-enabled SGW 116 that can also serve the TWAN 106.

At step 6 of FIG. 6A, the TWAP 126 sends an internal message to the TWAG 120 with the updated information for establishing a PDN connection via the selected SGW 116 and PGW 110. At step 7 of FIG. 6A, the TWAG 120 sends a GTP-C Create Session Request message to the selected SGW 116 over the disclosed S1a interface. The message may include APN, IMSI, RAT type (e.g., ISW-WLAN), BSSID, SSID, etc.). At step 8 of FIG. 6A, the SGW 116 may use this information to select the PGW 110. The SGW 116 then sends a GTP-C Create Session Request message to the selected PGW 110 over the S5 interface. At step 9 of FIG. 6A, if dynamic policy and charging control (PCC) is implemented, the PGW 110 indicates the session establishment to the Policy and Charging Rules Function (PCRF) 128 in order to retrieve the QoS and charging rules. The PGW 110 may then enforce these rules. If dynamic PCC is not implemented, such rules may be pre-configured in the PGW 110.

At step 10 of FIG. 6A, the PGW uses the S6b interface to update the 3GPP AAA Server 108 with the associated PGW 110 connectivity information for the UE 122. In addition, it also provides the associated SGW 116 information. The 3GPP AAA Server 108 subsequently updates the Home Subscriber System (HSS) 126 with this information via the SWx interface. At step 11 of FIG. 6B, the PGW 110 sends the GTP-C Create Session Response message to the SGW 116 over the S5 interface including GTP tunnel information, bearer parameters, and the allocated UE IP address. The GTP tunnel between the PGW 110 and SGW 116 is then established.

At step 12 of FIG. 6B, the SGW 116 sends the GTP-C Create Session Response message to the TWAG 120 over the newly proposed S1a interface. The message may include GTP tunnel information, bearer parameters, and the allocated UE IP address. At step 13 of FIG. 6B, the TWAG 120 sends an internal message to the TWAP 126 informing it that the S1a bearer has been successfully established. At step 14 of FIG. 6B, the TWAP 126 indicates completion of the PDN Connection procedure to the UE 122 via an internal message to the WLAN AN function 102. At step 15 of FIG. 6B, the WLAN AN 102 indicates successful PDN Connection establishment to the UE 122 via the WLCP protocol over the SWw interface. At step 16 of FIG. 6B, if the UE did not receive its IPv4 address in the previous step, it may negotiate the IPv4 address with the TWAG 120 via DHCPv4. The TWAG 120 may now route packets between the UE 122 and PGW 110 via the SGW 116.

It is understood that the entities performing the steps illustrated in FIG. 6A-B are logical entities that may be implemented in the form of software (i.e., computer-executable instructions) stored in a memory of, and executing on a processor of, a device, server, or other computer system such as one of those illustrated in FIG. 12A or 12B. That is, the method(s) illustrated in FIG. 6A-B may be implemented in the form of software (i.e., computer-executable instructions) stored in a memory of a computing device, such as for example the device or computer system illustrated in FIG. 12A or 12B, which computer executable instructions, when executed by a processor of the computing device, perform the steps illustrated in FIG. 6A-B. It is also understood that any transmitting and receiving steps illustrated in FIG. 7A-B may be performed by communication circuitry of the node under control of the processor of the node and the computer-executable instructions (e.g., software) that it executes.

In an embodiment, intra-SGW handover from LTE to TWAN 106 may be enabled. In this embodiment, the UE 122 may attach via TWAN 106 to establish a connection to a PDN 130 it is already connected to via LTE. In the described example, it is assumed that there are no other existing connections to this PDN via TWAN 106. In this embodiment, the 3GPP AAA server 108 may assign an ISW-enabled SGW 116 as an intermediate gateway for the TWAN PDN connection and the ISW-enabled SGW 116 may be serving the UE 122 via an LTE connection to the same PDN 130 already. Once the TWAN connection is established, the UE 122 may release the associated LTE connection thereby completing a handover from LTE to TWAN 106. In the example signal flow 700 shown in FIG. 7A-B and described below, the UE requests EPC access via TWAN 106 assuming the SaMOG phase-2 multi-PDN connection scenario and the 3GPP AAA server 108 maintains information about the ISW-enabled SGWs 116 and ISW-enabled TWANs 106.

Figure 7A:
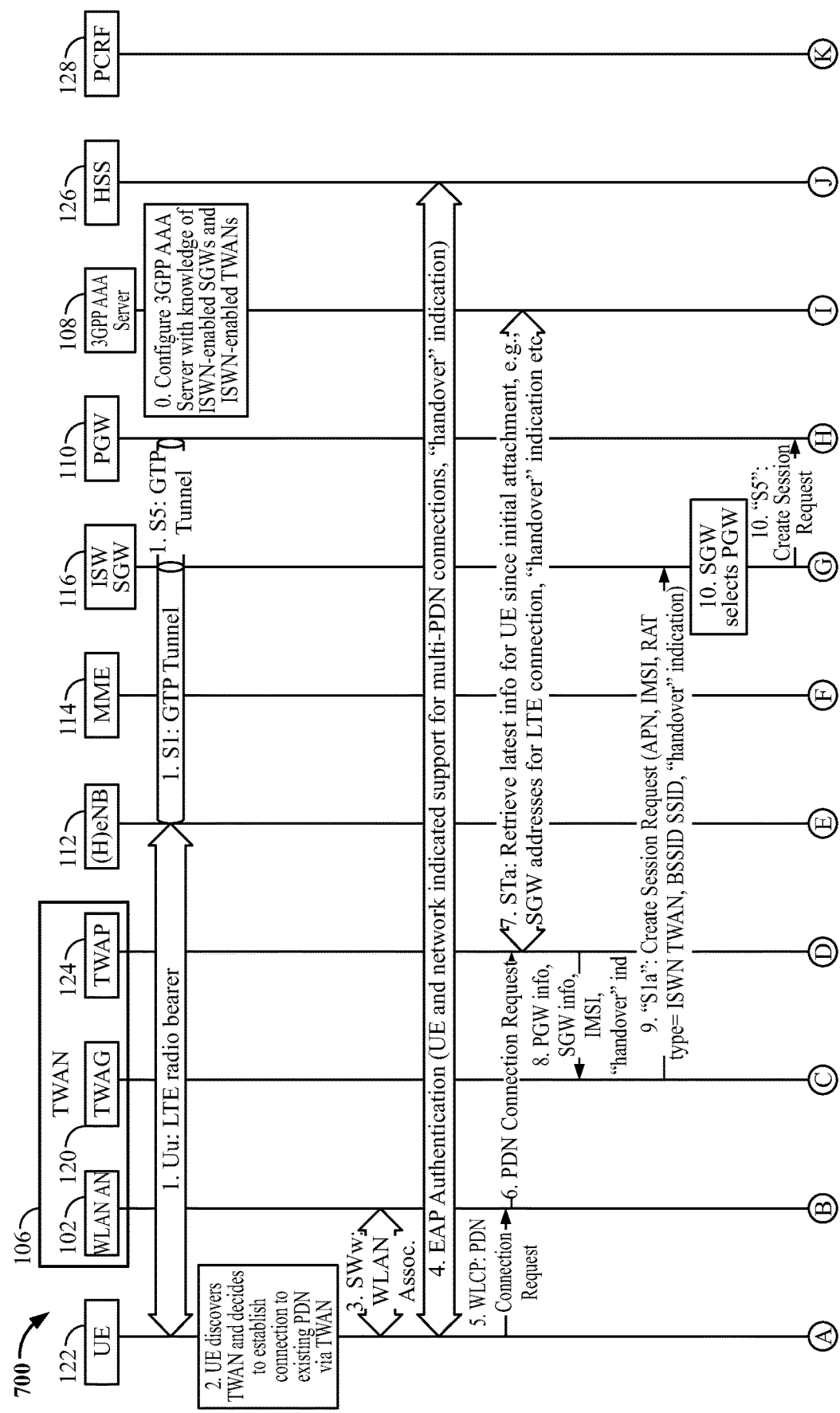
FIG. 7A-B is a flow diagram that illustrates the UE requesting EPC access via TWAN assuming the SaMOG phase-2 multi-PDN connection scenario and the 3GPP AAA server maintaining information about the ISW-enabled SGWs and ISW-enabled TWANs.

At step 1 of FIG. 7A of signal flow 700, a UE 122 is already using (H)eNB LTE access to a PDN 130 through the PGW via an ISW-enabled SGW 116. The connection consists of a concatenation of an LTE radio bearer over the Uu interface between the UE 122 and (H)eNB 112, a GTP tunnel over the S1 interface between the (H)eNB 112 and SGW 116, and a GTP tunnel over the S5 interface between the SGW 116 and PGW 110. At step 2 of FIG. 7A, the UE 122 discovers a WiFi AP belonging to the operator's TWAN 106 and decides to handover an existing PDN connection from the (H)eNB 112 to the TWAN 106. The UE 122 may discover and attempt association with this WiFi AP based on pre-configured information, ANDSF policies, ANQP signaling, etc.

At step 3 of FIG. 7A, the UE 122 associates to the WiFi AP. Association may occur using standard IEEE 802.11 procedures via the SWw interface. At step 4 of FIG. 7A, EAP authentication may be performed in a manner similar to that described in regard to FIG. 5A-B, except that in this embodiment, the EAP payload may contain an indication of the UE's multi-PDN support per the SaMOG phase-2 solution. A handover indication may also be exchanged as part of the extended EAP signaling. At step 5 of FIG. 7A, the UE 122 requests a PDN Connection via the SaMOG phase-2 WLCP. This request may include the APN for the current PDN connection existing over LTE. At block 6, the WLAN AN 102 function in the TWAN 106 may forward the PDN Connection Request to the TWAP 126.

At step 7 of FIG. 7A, the TWAP 126 communicates with the 3GPP AAA Server 108 over the STa interface to retrieve the latest information for the subscribed UE 122. In one example, the TWAP 126 identifies an SGW 116 to be used as an intermediate gateway. Since the UE 122 may already have PDN connectivity via LTE, the 3GPP AAA server 108 indicates the same SGW 116, assuming that the SGW 116 is an ISW-enabled SGW 116 that can also serve the TWAN 106. At step 8 of FIG. 7A, the TWAP 126 sends an internal message to the TWAG 120 with the updated information for establishing a PDN connection via the selected SGW and PGW. At step 9 of FIG. 7A, the TWAG 120 sends a GTP-C Create Session Request message to the selected SGW 116 over the S1a interface disclosed herein. The message may include APN, IMSI, RAT type (e.g., ISW-WLAN), BSSID, SSID, etc.), along with the "handover" indication. At step 10 of FIG. 7A, the SGW 116 may use this information to select the PGW 110. The SGW 116 sends a Create Session Request with "Handover" Indication for the existing APN to the PGW 110. Since some embodiments include the intra-SGW handover of an existing PDN connection, the same PGW 110 may be used. Therefore, when the PGW 110 sees the Create Session Request message with the handover indication, the PGW 110 may use the existing GTP tunnel rather than create a new one with the SGW 116. The main effect of this message is to allow the PGW 110 to notify the PCRF 128 of the change in access such that the appropriate policy and charging takes place.

Figure 7B:
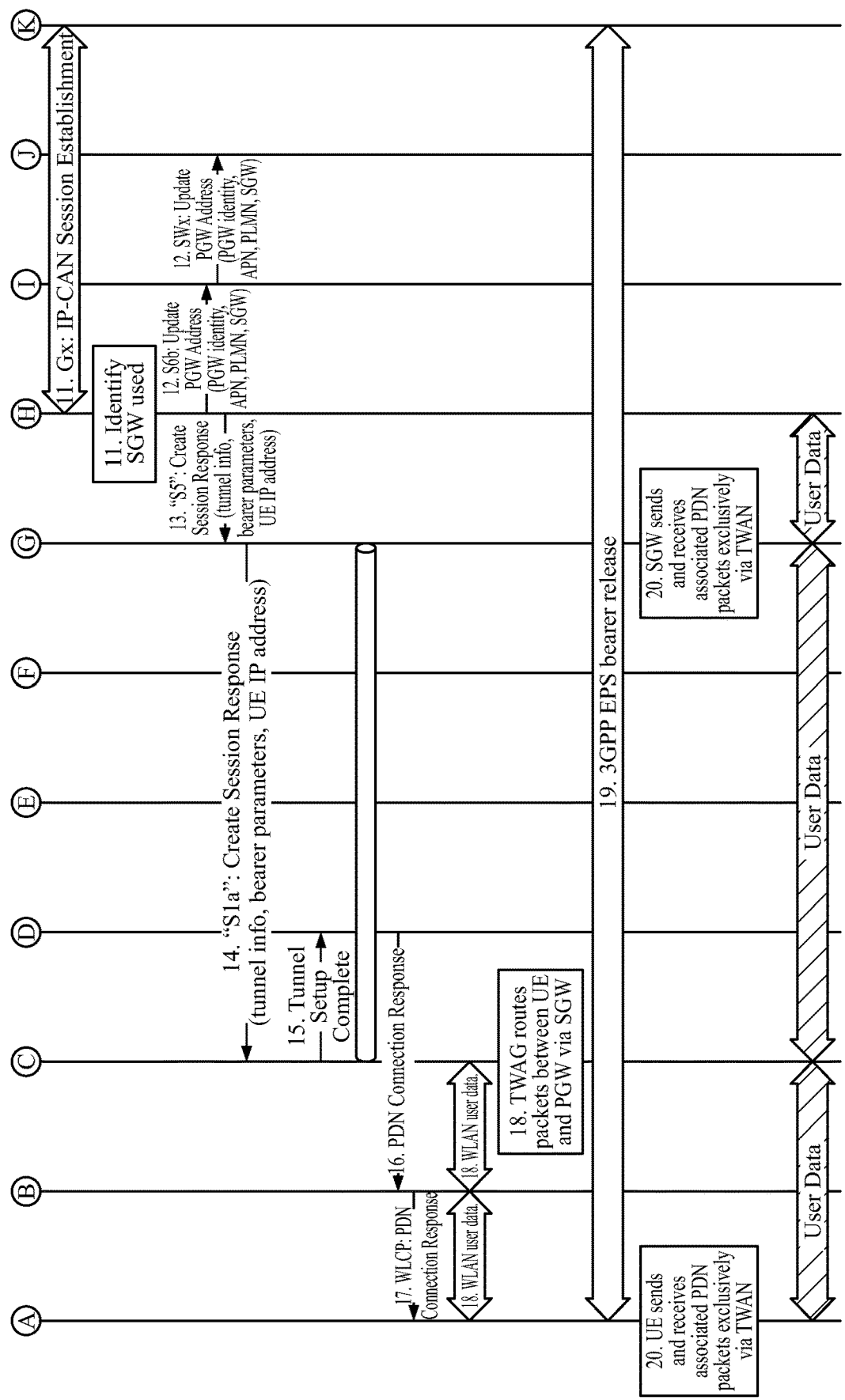

At step 11 of FIG. 7B, if dynamic PCC is implemented, the PGW 110 indicates the session establishment to the Policy and Charging Rules Function (PCRF) 128 in order to retrieve the QoS and charging rules. Since the handover indication is included, the PGW 110 executes a PCEF-initiated IP-CAN Session Modification Procedure with the PCRF 128 to obtain the policy and charging rules to be enforced. The PGW 110 may then enforce these rules. If dynamic PCC is not implemented, such rules may be pre-configured in the PGW 110.

At step 12 of FIG. 7B, the PGW 110 uses the S6b interface to update the 3GPP AAA Server 108 with the associated PGW connectivity information for the UE 122. In addition, it also provides the associated SGW information. The 3GPP AAA Server 108 subsequently updates the Home Subscriber System (HSS) 126 with this information via the SWx interface. At step 13 of FIG. 7B, the PGW 110 sends the GTP-C Create Session Response message to the SGW 116 over the S5 interface including GTP tunnel information, bearer parameters, and the allocated UE IP address. This message may include the previously allocated IP address for the UE 122. The GTP tunnel between the PGW 110 and SGW 116 is then established.

At step 14 of FIG. 7B, the SGW 116 sends the GTP-C Create Session Response message to the TWAG 120 over the newly proposed S1a interface. The message may include GTP tunnel information, bearer parameters, and the allocated UE IP address. This message may also include the previously allocated IP address for the UE 122. At step 15 of FIG. 7B, the TWAG 120 may send an internal message to the TWAP 126 informing it that the S1a bearer has been successfully established. At step 16 of FIG. 7B, the TWAP 126 may indicate completion of the PDN Connection procedure to the UE 122 via an internal message to the WLAN AN function. At step 17 of FIG. 7B, the WLAN AN 102 indicates successful PDN Connection establishment to the UE 122 via the WLCP protocol over the SWw interface. At step 18 of FIG. 7B, the TWAG 120 may now route packets between the UE 122 and PGW 110 via the SGW 116. At step 19 of FIG. 7B, the UE 122 initiates release of the 3GPP EPS bearer, and At step 20 of FIG. 7B, the UE 122 and SGW 116 send and receive associated PDN packets exclusively via the TWAN 106.

It is understood that the entities performing the steps illustrated in FIG. 7A-B may be are logical entities that may be implemented in the form of software (i.e., computer-executable instructions) stored in a memory of, and executing on a processor of, a device, server, or other computer system such as one of those illustrated in FIG. 12A or 12B. That is, the method(s) illustrated in FIG. 7A-B may be implemented in the form of software (i.e., computer-executable instructions) stored in a memory of a computing device, such as for example the device or computer system illustrated in FIG. 12A or 12B, which computer executable instructions, when executed by a processor of the computing device, perform the steps illustrated in FIG. 7A-B. It is also understood that any transmitting and receiving steps illustrated in FIG. 7A-B may be performed by communication circuitry of the node under control of the processor of the node and the computer-executable instructions (e.g., software) that it executes.

Figure 8A:
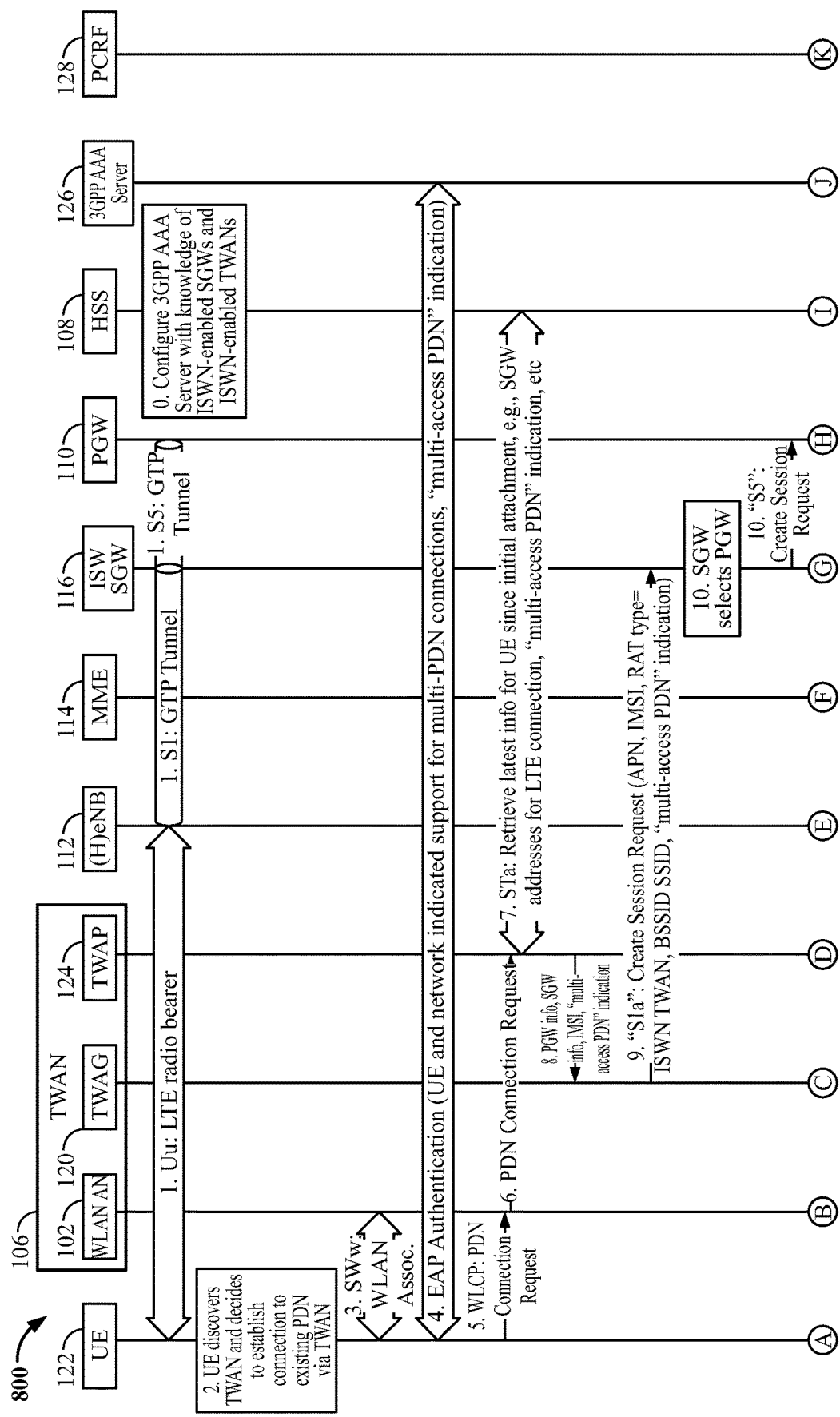
FIG. 8A-B is a flow diagram that illustrates exemplary intra-SGW multi-connection attach via TWAN signal flow according to an embodiment.
Figure 8B:
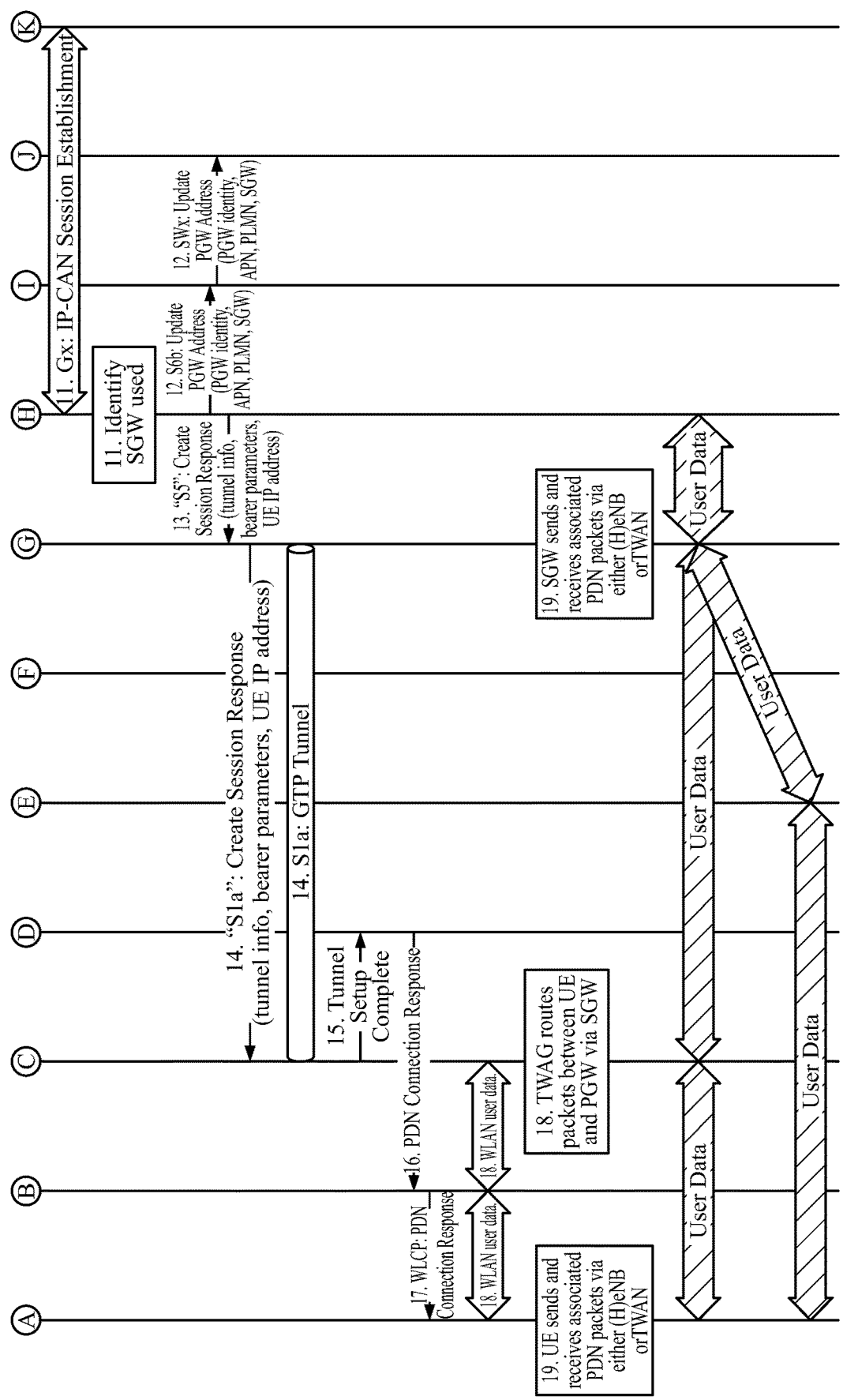

FIG. 8A-B illustrates exemplary intra-SGW multi-connection attach via TWAN signal flow 800 according to an embodiment. In this exemplary embodiment, the UE 122 may attach via TWAN 106 to establish a connection to a PDN 130 to which the UE 122 is already connected via LTE. In this embodiment, the 3GPP AAA server 108 may assign an ISW-enabled SGW 116 as an intermediate gateway for the TWAN PDN connection. Multi-PDN UE capability as described for the SaMOG Phase 2 solution may be used. In some embodiments, the ISW-enabled SGW 116 is already serving the UE 122 via an LTE connection to the same PDN 130. Once the TWAN 106 connection is established, the UE may maintain both connections and assign transmission of specific uplink IP traffic flows to either the TWAN 106 or LTE access depending on locally stored policies, signal conditions, etc. Although the access can change on a packet-by-packet basis, in many embodiments a specific access may typically be used for a stable period of time as long as conditions allow. The SGW 116 may keep track of the access for received uplink IP packets and may transmit the associated downlink packets (e.g., based on corresponding 5-tuple) via the same access. Alternatively, the SGW 116 may send downlink packets over either access based on its own criteria, e.g., for load balancing, etc.

In this description of signal flow 800, it is assumed that the 3GPP AAA server 108 maintains information about the ISW-enabled SGWs 116 and ISW-enabled TWANs 106. At step 1 of FIG. 8A, the UE 122 is using LTE (H)eNB access to a specific PDN 130 via an ISW-enabled SGW connection to the PGW 110. The connection may consist of a concatenation of an LTE radio bearer over the Uu interface between the UE 102 and (H)eNB 112, a GTP tunnel over the S1 interface between the (H)eNB 112 and SGW 116, and a GTP tunnel over the S5 interface between the SGW 116 and PGW 110. At step 2 of FIG. 8A, the UE 122 may discover a WiFi AP belonging to the operator's TWAN 106 and may decide to establish a multi-access connection to the existing PDN 130. The UE 122 may discover and attempt association with this WiFi AP based on pre-configured information, ANDSF policies, ANQP signaling, etc. The UE 122 may decide to initiate the multi-access PDN connection based on local policies and conditions (e.g., signal strength, perceived congestion, battery power, etc.).

At step 3 of FIG. 8A, the UE 122 associates to a WiFi AP that is part of the operator's TWAN 106. Association may occur using standard IEEE 802.11 procedures via the SWw interface. At step 4 of FIG. 8A, EAP authentication is performed in a similar manner as that described in regard to FIG. 5A-B, except in this embodiment the EAP payload may contain an indication of the UE's multi-PDN support per the SaMOG phase-2 solution. The multi-access PDN connection indication may also be exchanged as part of the extended EAP signaling proposed in this disclosure. At block 5, the UE 122 may request a PDN connection via the SaMOG phase-2 WLCP. The UE 122 may include the APN for the same PDN 130 accessed via the existing LTE connection. At block 6, the WLAN AN 102 function in the TWAN 106 forwards the PDN connection request to the TWAP 126.

At step 7 of FIG. 8A, the TWAP 126 communicates with the 3GPP AAA server 108 over the STa interface to retrieve the latest information for the subscribed UE 122. In this example, the 3GPP AAA server 108 identifies an ISW-enabled SGW 116 to be used as an intermediate gateway. Since in this case the UE 122 already has PDN connectivity via LTE, the 3GPP AAA server 108 indicates the same SGW 116 if the SGW 116 is an ISW-enabled SGW 116 that can also serve the TWAN 106. It may also provide the multi-access PDN connection indication. At step 8 of FIG. 8A, the TWAP 126 may send an internal PDN connection request message to the TWAG 120 with information for establishing a multi-access connection to the existing PDN 130 via the selected SGW 116 and PGW 110.

At block 9, the TWAG 120 may send a GTP-C Create Session Request message to the selected SGW 116 over the newly proposed S1a interface. The message may include APN, IMSI, RAT type (e.g., ISW-WLAN), BSSID, SSID, etc., along with the multi-access PDN connection indication. At step 10 of FIG. 8A, the SGW 116 may use this information to select the PGW 110. The SGW 116 then sends a Create Session Request with a multi-connection indication for the existing APN to the PGW. Since this example includes the intra-SGW multi-connection to an existing PDN 130, the same PGW 110 will be used. Therefore, when the PGW 110 sees the Create Session Request message with the multi-connection indication, the PGW 110 will use the existing SGW GTP tunnel rather than create a new one with the SGW 116. One function of this message is to allow the PGW 110 to notify the PCRF 128 of the additional TWAN access such that the appropriate policy and charging takes place. At step 11 of FIG. 8B, if dynamic PCC is implemented, the PGW 110 may indicate the TWAN session establishment to the PCRF 128 in order to retrieve the QoS and charging rules. Since the multi-connection indication is included, the PGW 110 executes a PCEF-initiated IP-CAN Session Modification Procedure with the PCRF 128 to obtain the policy and charging rules to be enforced. The PGW 110 may then enforce these rules. If dynamic PCC is not implemented, such rules may be pre-configured in the PGW 110.

At step 12 of FIG. 8B, the PGW 110 may use the S6b interface to update the 3GPP AAA server 108 with the associated PGW connectivity information for the UE 122. The PGW 110 may also provide the associated SGW address and multi-connection information to the 3GPP AAA server 108. The 3GPP AAA server 108 subsequently updates the Home Subscriber System (HSS) 126 with this information via the SWx interface. At step 13 of FIG. 8B, the PGW 110 may send the GTP-C Create Session Response message to the SGW 116 over the S5 interface. The message may include GTP tunnel information, bearer parameters, and/or the allocated UE IP address. This message may also include the previously allocated IP address for the UE. At step 14 of FIG. 8B, the SGW 116 may send the GTP-C Create Session Response message to the TWAG 120 over the newly proposed S1a interface. The message may include GTP tunnel information, bearer parameters, and the allocated UE IP address. This message may also include the previously allocated IP address for the UE 122.

At step 15 of FIG. 8B, the TWAG 120 may send an internal message to the TWAP 126 informing it that the S1a bearer has been successfully established. At step 16 of FIG. 8B, the TWAP 126 indicates completion of the PDN Connection procedure to the UE 122 via an internal message to the WLAN AN 102 function. At step 17 of FIG. 8B, the WLAN AN 102 may indicate successful PDN Connection establishment to the UE 122 via the WLCP protocol over the SWw interface. At step 18 of FIG. 8B, the TWAG 120 can now route packets between the UE 122 and PGW 110 via the SGW. At step 19 of FIG. 8B, the UE 122 may route packets via ISW-SGW to the PDN over either TWAN 106 or (H)eNB 112. The SGW 116 may route packets to the UE 122 over either TWAN 106 or (H)eNB 112.

In an embodiment, an initial attach may be performed via (H)eNB 112. In current implementations, an initial attach via (H)eNB 112 may utilize the standard SGW baseline EPC architecture and protocols. In many embodiments, initial attach via (H)eNB 112 may continue to be performed as normal and may not need to be adjusted to accommodate the disclosed the architecture and protocol extensions. However, according to a disclosed embodiment, the MME 114 may assign an ISW-enabled SGW 116 for initial LTE access. The MME 114 may be made aware of this information as part of the extended information provided by the HSS 126 via the S6b interface.

It is understood that the entities performing the steps illustrated in FIG. 8A-B are logical entities that may be implemented in the form of software (i.e., computer-executable instructions) stored in a memory of, and executing on a processor of, a device, server, or other computer system such as one of those illustrated in FIG. 12A or 12B. That is, the method(s) illustrated in FIG. 8A-B may be implemented in the form of software (i.e., computer-executable instructions) stored in a memory of a computing device, such as for example the device or computer system illustrated in FIG. 12A or 12B, which computer executable instructions, when executed by a processor of the computing device, perform the steps illustrated in FIG. 8A-B. It is also understood that any transmitting and receiving steps illustrated in FIG. 8A-B may be performed by communication circuitry of the node under control of the processor of the node and the computer-executable instructions (e.g., software) that it executes.

Figure 9A:
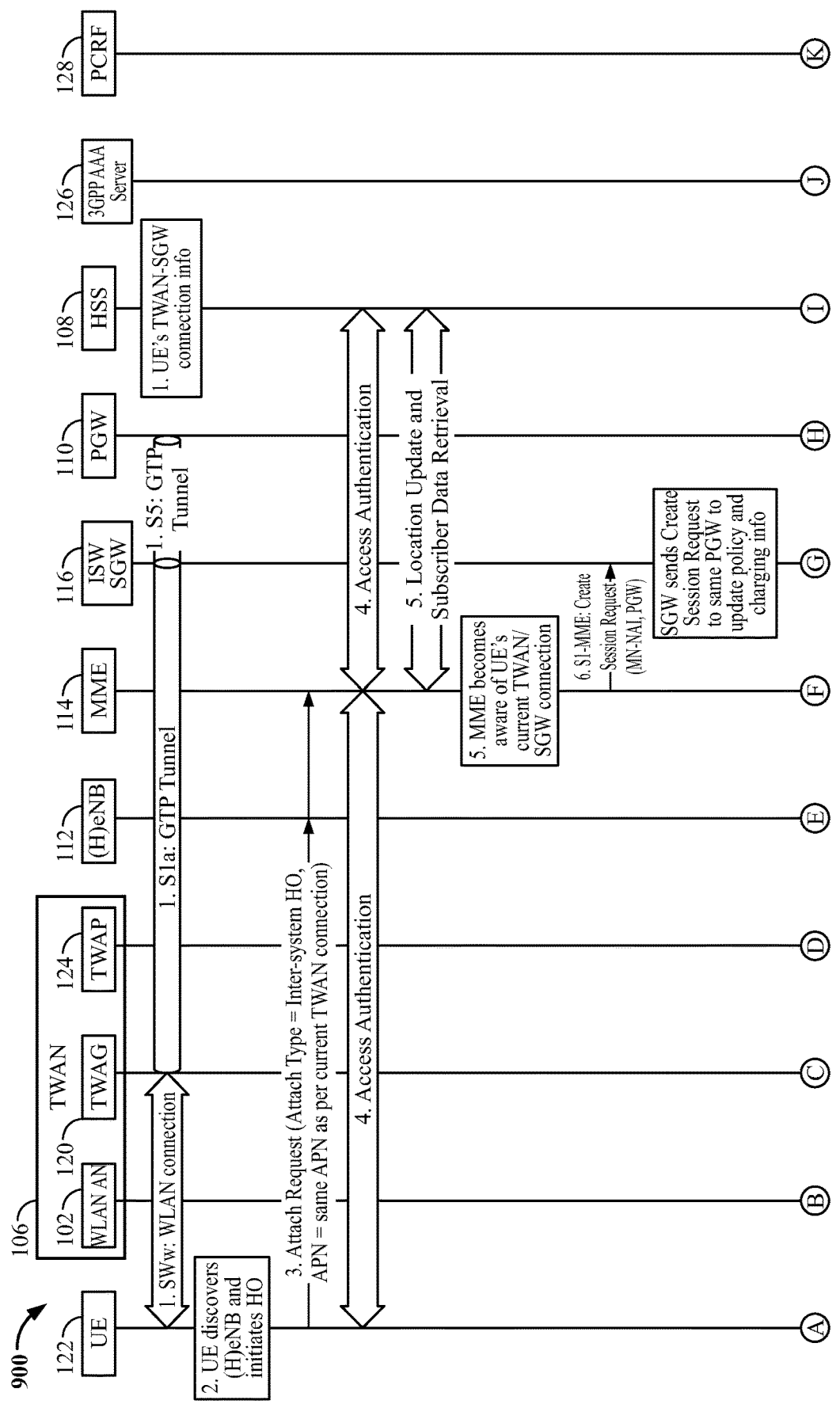
FIG. 9A-B is a flow diagram that illustrates exemplary, non-limiting signal flow demonstrating inter-system handover using the disclosed intra-SGW procedure.
Figure 9B:
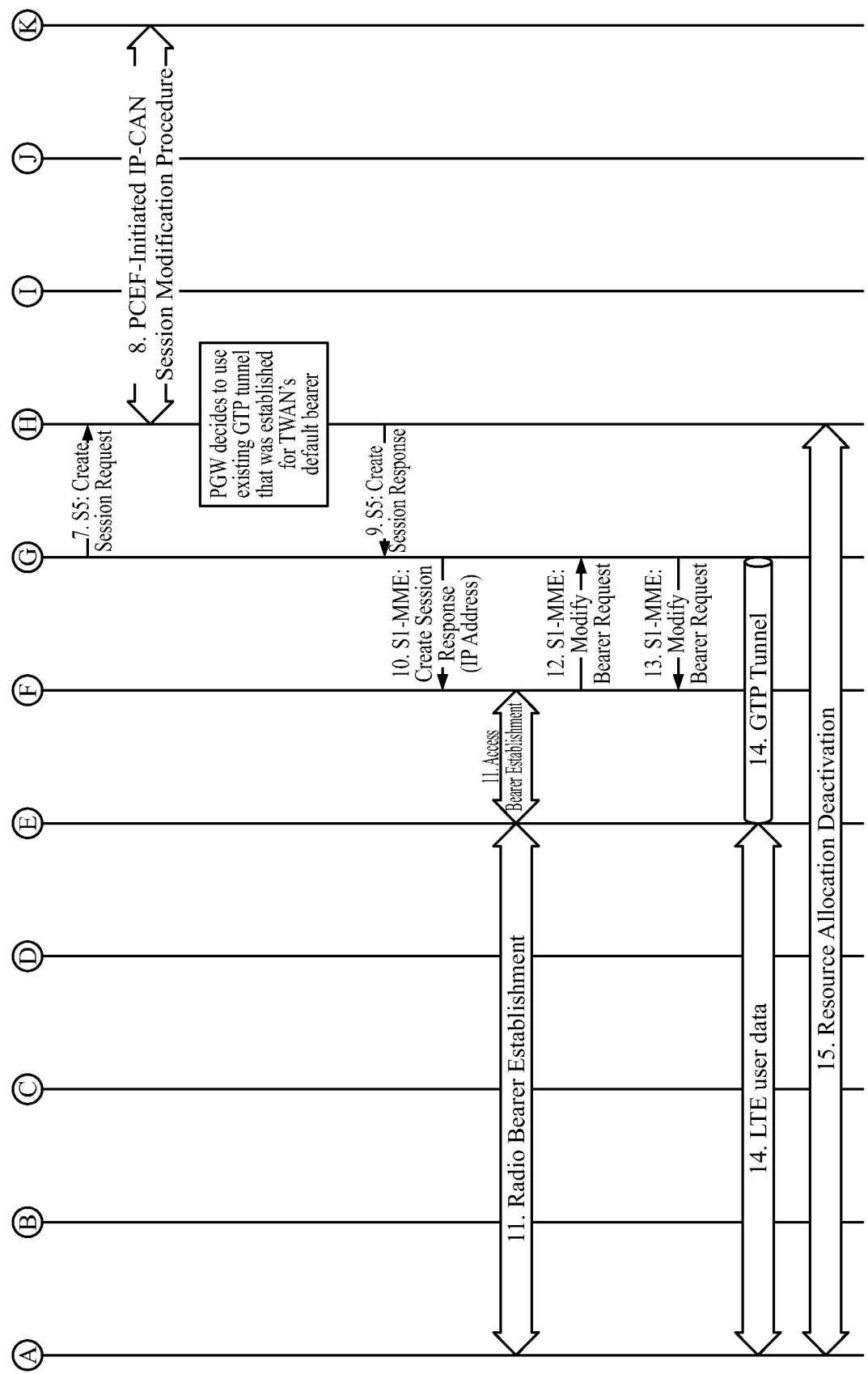

In some of the disclosed embodiments, intra-system LTE handover may an S1-based handover or an X2-based handover. Where different SGWs 116 are serving the source and target eNBs, a required SGW "relocation" procedure may be also specified. Intra-LTE handovers may be network-initiated and may be based on UE measurements reported to the network, while inter-system handovers may be UE-initiated. In the disclosed UE-initiated inter-system handover, the S1-based handover may be extended to include the disclosed S1a interface. Both intra-SGW and inter-SGW handover are contemplated herein; however, the intra-SGW case provides the benefit of local mobility handling. FIG. 9A-B is a diagram that illustrates exemplary, non-limiting signal flow 900 demonstrating inter-system handover using the disclosed intra-SGW procedure. In this example, a PDN connection may already exist via the concatenation of a WLAN link between a UE 122 and a TWAN 106, a GTP tunnel between a TWAN 106 and an SGW 116, and/or another GTP tunnel between an SGW 116 and a PGW 110. This embodiment may be extended to include the handover of one or more dedicated bearers using the concatenation of additional GTP tunnels.

At step 1 of FIG. 9A, a UE 122 may be using a TWAN 106 to connect to a PGW 110 via an ISW-SGW 116 (i.e., the "intermediate gateway" embodiment set forth herein). The connection may consist of a concatenation of a WLAN link over the SWw interface between the UE 122 and TWAN 106, a GTP tunnel over the newly proposed S1a interface between the TWAN 106 and SGW 116, and a GTP tunnel over the S5 interface between the SGW 116 and PGW 110. At step 2 of FIG. 9A, the UE 122 decides to transfer its current sessions (i.e., handover) from the TWAN to the (H)eNB 112. The UE may use ANDSF policies to determine the course of action. At step 3 of FIG. 9A, the UE 122 may send an Attach Request to the MME 114 including Attach Type and APN. The message may be routed by the (H)eNB 112 to the MME 114. In inter-system handover embodiments, the UE 122 may include the "Handover" indication. For inter-system "Handover" embodiments, the UE 122 may include any one of the APNs corresponding to the PDN connections in the TWAN 106.

At step 4 of FIG. 9A, the MME 116 may contact the HSS 126 and authenticate the UE 122. At step 5 of FIG. 9A, after successful authentication, the MME 114 performs a location update procedure and subscriber data retrieval from the HSS 126. If the Request Type was "Handover", the PGW address conveyed to the MME 114 may be stored in the MME's PDN subscription context. The MME 114 may receive information for the UE's TWAN PDN connection via the subscriber data obtained from the HSS 126. Based on the architecture set forth herein, the HSS 126 may be extended to also include new information regarding the SGW 116 that the UE 122 is connected to via the TWAN 106.

At step 6 of FIG. 9A, the MME 114 may select an APN, SGW 116, and PGW 110. In cases where the (H)eNB 112 can be served by the same SGW 116 as the TWAN 106 (i.e., the SGW 116 is an ISW-enabled SGW 116), the MME 114 may send a Create Session Request (including IMSI, MME Context ID, PGW address, APN, and "Handover" indication) message to the selected SGW. At step 7 of FIG. 9B, the SGW 116 may send a Create Session Request ("Handover" Indication) message to the PGW 110. In intra-SGW handover embodiments using an existing PDN connection, the same PGW 110 may be used. Therefore, when the PGW 110 sees the Create Session Request message with the inter-system "Handover" indication and the same APN as per the existing session with the TWAN 106, the PGW 110 may use the existing GTP tunnel rather than create a new one with the SGW 116. This message may notify the PCRF 128 of the change in access such that the appropriate policy and charging takes place. Because a "Handover" indication is included, at step 8 of FIG. 9B the PGW 110 may execute a PCEF-initiated IP-CAN Session Modification Procedure with the PCRF 128 to obtain the policy and charging rules to be enforced.

At step 9 of FIG. 9B, the PGW 110 responds by transmitting a Create Session Response message to the SGW 116. In inter-system "Handover" embodiments, this message may include the IP address or prefix that was assigned to the UE 122 for TWAN access. It may also contain the charging ID that was assigned for the PDN connection through the TWAN 106. At step 10 of FIG. 9B, the SGW 116 may return a Create Session Response message to the MME 114. This message may also include the IP address of the UE 122. At step 11 of FIG. 9B, the MME 114 may initiate access bearer establishment between the (H)eNB 112 and SGW 116 and radio bearer establishment between the UE 122 and (H)eNB 112. At step 12 of FIG. 9B, the MME 114 may send a Modify Bearer Request (including e.g., an eNB address, an eNB TEID, and an inter-system "Handover" indication) to the SGW 116 in order to establish the GTP tunnel to the (H)eNB 112. The existing GTP tunnel between SGW 116 and PGW 110 is not affected. At step 13 of FIG. 9B, the SGW 116 may acknowledge by sending a Modify Bearer Response (with EPS Bearer Identity) message to the MME 114. At step 14 of FIG. 9B, the UE 122 may send and receive data at this point via the (H)eNB 112. At step 15 of FIG. 9B, the PGW 110 may initiate TWAN resource allocation deactivation in some embodiments using existing means and methods for doing so.

It is understood that the entities performing the steps illustrated in FIG. 9A-B are logical entities that may be implemented in the form of software (i.e., computer-executable instructions) stored in a memory of, and executing on a processor of, a device, server, or other computer system such as one of those illustrated in FIG. 12A or 12B. That is, the method(s) illustrated in FIG. 9A-B may be implemented in the form of software (i.e., computer-executable instructions) stored in a memory of a computing device, such as for example the device or computer system illustrated in FIG. 12A or 12B, which computer executable instructions, when executed by a processor of the computing device, perform the steps illustrated in FIG. 9A-B. It is also understood that any transmitting and receiving steps illustrated in FIG. 9A-B may be performed by communication circuitry of the node under control of the processor of the node and the computer-executable instructions (e.g., software) that it executes.

Figure 10A:
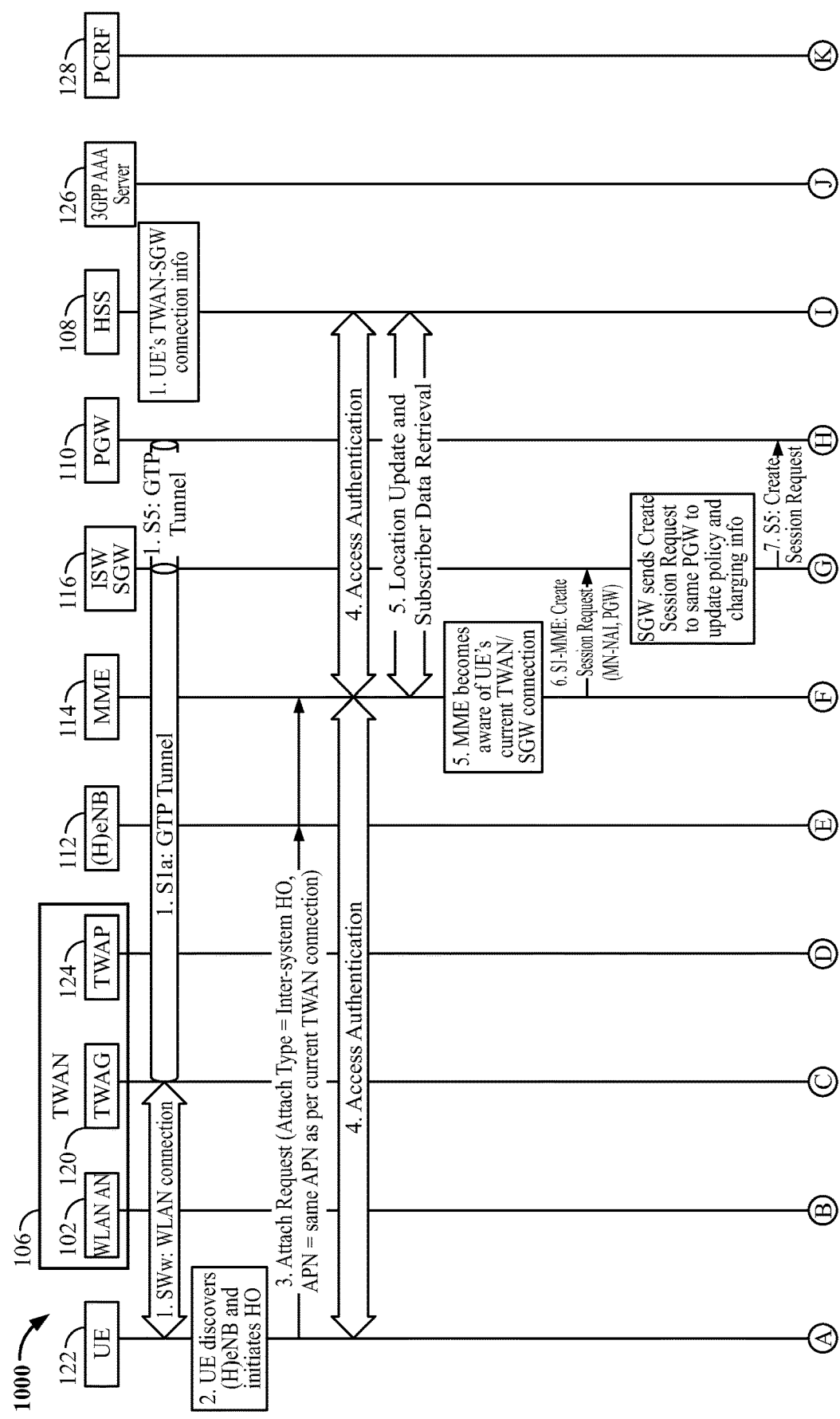
FIG. 10A-B is a flow diagram that illustrates exemplary signal flow that may be used in intra-SGW multi-connection attach via LTE embodiments.
Figure 10B:
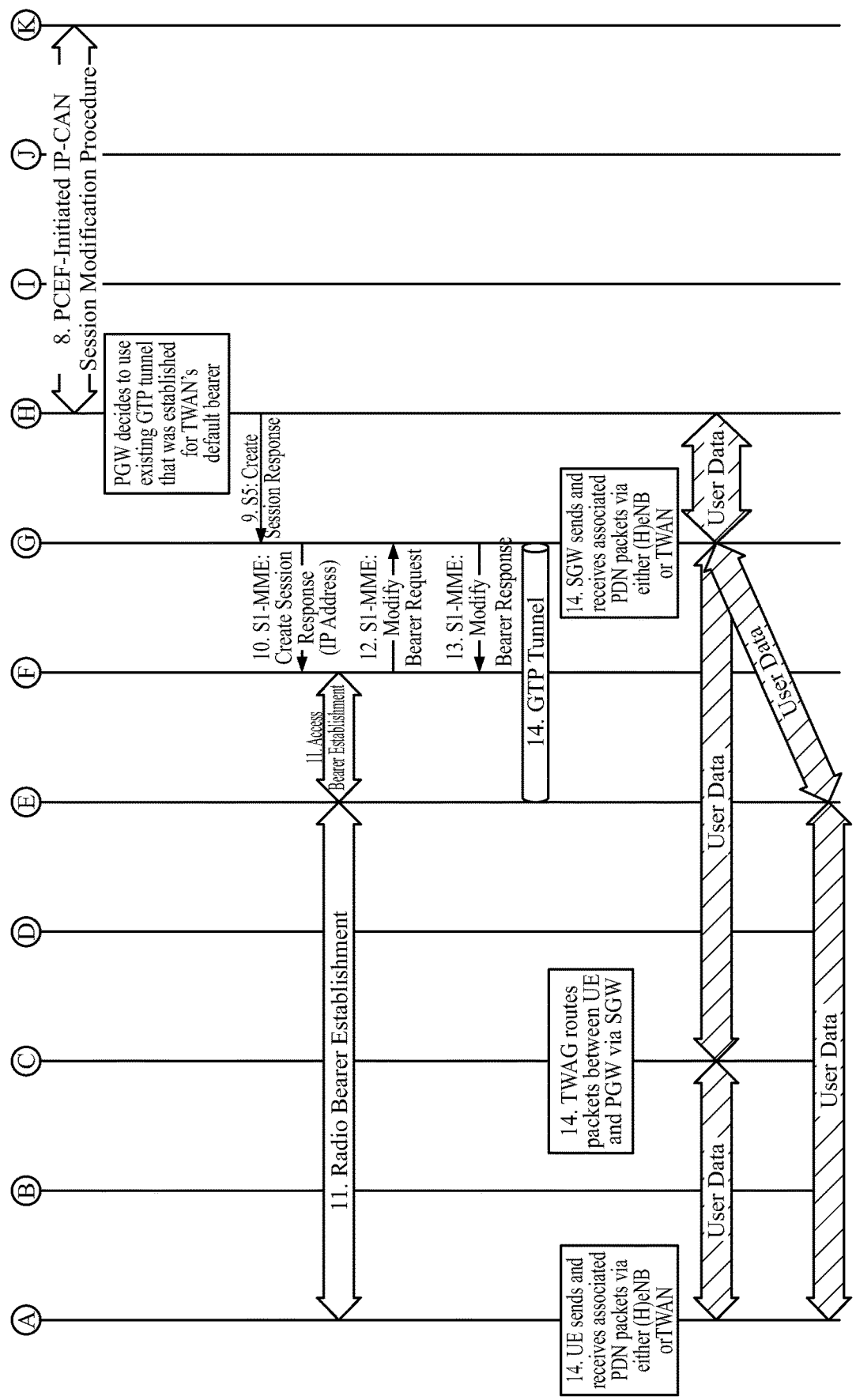

In an embodiment, intra-SGW multi-connection attach via LTE may be performed. In such an embodiment, the UE 122 may attach via LTE to establish a connection to a PDN 130 it is already connected to via TWAN 106. Based on information provided by the HSS 126, the MME 114 may assign an ISW-enabled SGW 116 as an intermediate gateway for the LTE PDN connection. FIG. 10A-B illustrates exemplary signal flow 1000 that may be used in intra-SGW multi-connection attach via LTE embodiments. In this example, it is assumed that an ISW-enabled SGW 116 is already serving a UE 122 via a TWAN connection to the same PDN 130. Once the LTE connection is established, the UE 122 may maintain both connections and assign transmission of specific uplink IP traffic flows to either the TWAN 106 or LTE access depending on locally stored policies, signal conditions, etc. Although the access can change on a packet-by-packet basis, usually a specific access will be used for a stable period of time as long as conditions allow. The SGW 116 may keep track of the access for received uplink IP packets and may transmit the associated downlink packets (e.g., based on corresponding 5-tuple) via the same access. Alternatively, the SGW 116 may send downlink packets over either access based on its own criteria, such as for load balancing or other purposes.

At step 1 of FIG. 10A, the UE 122 is using a TWAN 106 to connect to the PGW 110 via an ISW-SGW 116 (i.e., the "intermediate gateway" embodiments disclosed herein). The connection may consist of a concatenation of a WLAN link over the SWw interface between the UE 122 and TWAN 106, a GTP tunnel over the newly proposed S1a interface between the TWAN 106 and SGW 116, and a GTP tunnel over the S5 interface between the SGW 116 and PGW 110. At step 2 of FIG. 10A, the UE 122 discovers an (H)eNB 112 and decides to establish a multi-access connection to an existing PDN 130. The UE 122 may use ANDSF policies to determine the course of action. At step 3 of FIG. 10A, the UE 122 may send an Attach Request to the MME including Attach Type and APN. The message may be routed by an (H)eNB 112 to the MME 114. In the case of multi-access connectivity to an existing PDN 130, an indication for "Multi-connection" Attach may be used. For "multi-connection" attach, the UE 122 may include any one of the APNs corresponding to the PDN connections in the TWAN 106.

At step 4 of FIG. 10A, the MME 114 contacts the HSS 126 and authenticates the UE 122. At step 5 of FIG. 10A, after successful authentication, the MME 114 performs a location update procedure and subscriber data retrieval from the HSS 126. If the Request Type was "Multi-connection", the PGW address conveyed to the MME 114 may be stored in the MME's PDN subscription context. The MME 114 receives information for the UE's TWAN PDN connection via the Subscriber Data obtained from the HSS 126. Based on the disclosed architecture and embodiments, the HSS 126 may be extended to also include new information regarding the SGW 116 that the UE 122 is connected to via the TWAN 106.

At step 6 of FIG. 10A, the MME may select an APN, SGW, and PGW. Where the (H)eNB can be served by the same SGW 116 as the TWAN 106 (i.e., the SGW 116 is an ISW-enabled SGW 116), the MME 114 may send a Create Session Request (including IMSI, MME Context ID, PGW address, APN, and "Multi-connection" indication) message to the selected SGW 116. At step 7 of FIG. 10A, the SGW 116 sends a Create Session Request ("Multi-connection"

Indication) message to the PGW 110. In embodiments that include an intra-SGW 116 multi-access connection to an existing PDN 130, the same PGW 110 may be used. Therefore, when the PGW 110 sees the Create Session Request message with the "Multi-connection" indication and the same APN as per the existing session with the TWAN 106, the PGW 110 will use the existing GTP tunnel rather than create a new one with the SGW 116. This message may notify the PCRF 128 of the change in access such that the appropriate policy and charging takes place.

At step 8 of FIG. 10B, since the "Multi-connection" indication is included, the PGW 110 executes a PCEF-initiated IP-CAN Session Modification Procedure with the PCRF 128 to obtain the policy and charging rules to be enforced. At step 9 of FIG. 10B, the PGW 110 responds with a Create Session Response message to the SGW 116. In case of "Multi-connection", this message includes the IP address or prefix that was assigned to the UE for TWAN access. This message may also contain the charging ID that was assigned for the PDN connection through the TWAN. At step 10 of FIG. 10B, the SGW 116 returns a Create Session Response message to the MME 114. This message also includes the IP address of the UE 122.

At step 11 of FIG. 10B, the MME 114 initiates access bearers establishment between the (H)eNB 112 and SGW 116 and Radio Bearer establishment between the UE 122 and (H)eNB 112. At step 12 of FIG. 10B, the MME 114 sends a Modify Bearer Request (eNB address, eNB TEID, "Multi-connection" indication) to the SGW 116 in order to add the GTP tunnel from the (H)eNB 112. The existing GTP tunnel between SGW 116 and PGW 110 is not affected. At step 13 of FIG. 10B, the SGW 116 acknowledges by sending a Modify Bearer Response (with EPS Bearer Identity) message to the MME 114. At step 14 of FIG. 10B, the UE 122 sends and receives data via the (H)eNB 112 or TWAN 106.

It is understood that the entities performing the steps illustrated in FIG. 10A-B are logical entities that may be implemented in the form of software (i.e., computer-executable instructions) stored in a memory of, and executing on a processor of, a device, server, or other computer system such as one of those illustrated in FIG. 12A or 12B. That is, the method(s) illustrated in FIG. 10A-B may be implemented in the form of software (i.e., computer-executable instructions) stored in a memory of a computing device, such as for example the device or computer system illustrated in FIG. 12A or 12B, which computer executable instructions, when executed by a processor of the computing device, perform the steps illustrated in FIG. 10A-B. It is also understood that any transmitting and receiving steps illustrated in FIG. 10A-B may be performed by communication circuitry of the node under control of the processor of the node and the computer-executable instructions (e.g., software) that it executes.

Figure 11:
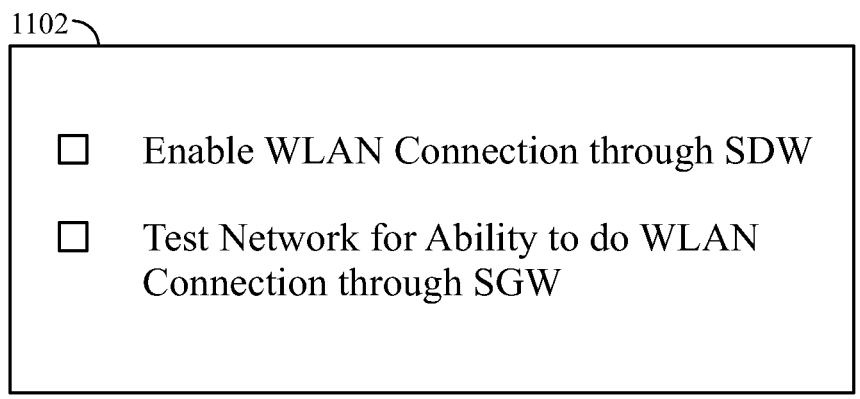
FIG. 11 is a diagram that illustrates an interface that allows a network to be configured to enable a WLAN connection through a SGW.

Interfaces, such as Graphical User Interfaces (GUIs), can be used to assist user to control and/or configure functionalities related to the service layer charging correlation. FIG. 11 is a diagram that illustrates an interface 1102 that allows a network to be configured to enable a WLAN connection through a SGW. The interface 1102 can be also used to test the network to see if a WLAN connection through the SGW is feasible. It is to be understood that interface 1102 can be produced using displays such as those shown in FIGS. 22C-D described below.

Example M2M/IoT/WoT Communication System

FIG. 12A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102.

As shown in FIG. 12A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 12A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M Gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M Gateway 14 allows wireless M2M devices (e.g. cellular and non-cellular) as well as fixed network M2M devices (e.g., PLC) to communicate either through operator networks, such as the communication network 12 or direct radio link. For example, the M2M Terminal Devices 18 may collect data and send the data, via the communication network 12 or direct radio link, to an M2M application 20 or other M2M Terminal Devices 18. The M2M Terminal Devices 18 may also receive data from the M2M application 20 or an M2M Terminal Device 18. Further, data and signals may be sent to and received from the M2M application 20 via an M2M service layer 22, as described below. M2M Terminal Devices 18 and gateways 14 may communicate via various networks including, cellular, WLAN, WPAN (e.g., Zigbee, 6LoWPAN, Bluetooth), direct radio link, and wireline for example.

Exemplary M2M Terminal Devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 12B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102. The M2M service layer 22 may be implemented by one or more servers, computers, devices, virtual machines (e.g. cloud/storage farms, etc.) or the like, including for example the devices illustrated in FIGS. 12C and 12D described below. It will be understood that the M2M service layer 22 may communicate with any number of M2M applications, M2M Gateways 14, M2M Terminal Devices 18, and communication networks 12 as desired. The M2M service layer 22 may be implemented by one or more nodes of the network, which may comprises servers, computers, devices, or the like. The M2M service layer 22 provides service capabilities that apply to M2M Terminal Devices 18, M2M Gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M Gateways 14 and M2M Terminal Devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 12B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102 may be hosted within a M2M service layer instance hosted by an M2M node, such as an M2M server, M2M gateway, or M2M device, as shown in FIG. 12B. For example, the logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 12C or FIG. 12D described below.

Further, logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102 can implemented as part of an M2M network that uses a Service Oriented Architecture (SOA) and/or a Resource-Oriented Architecture (ROA) to access services of the present application.

Figure 12C:
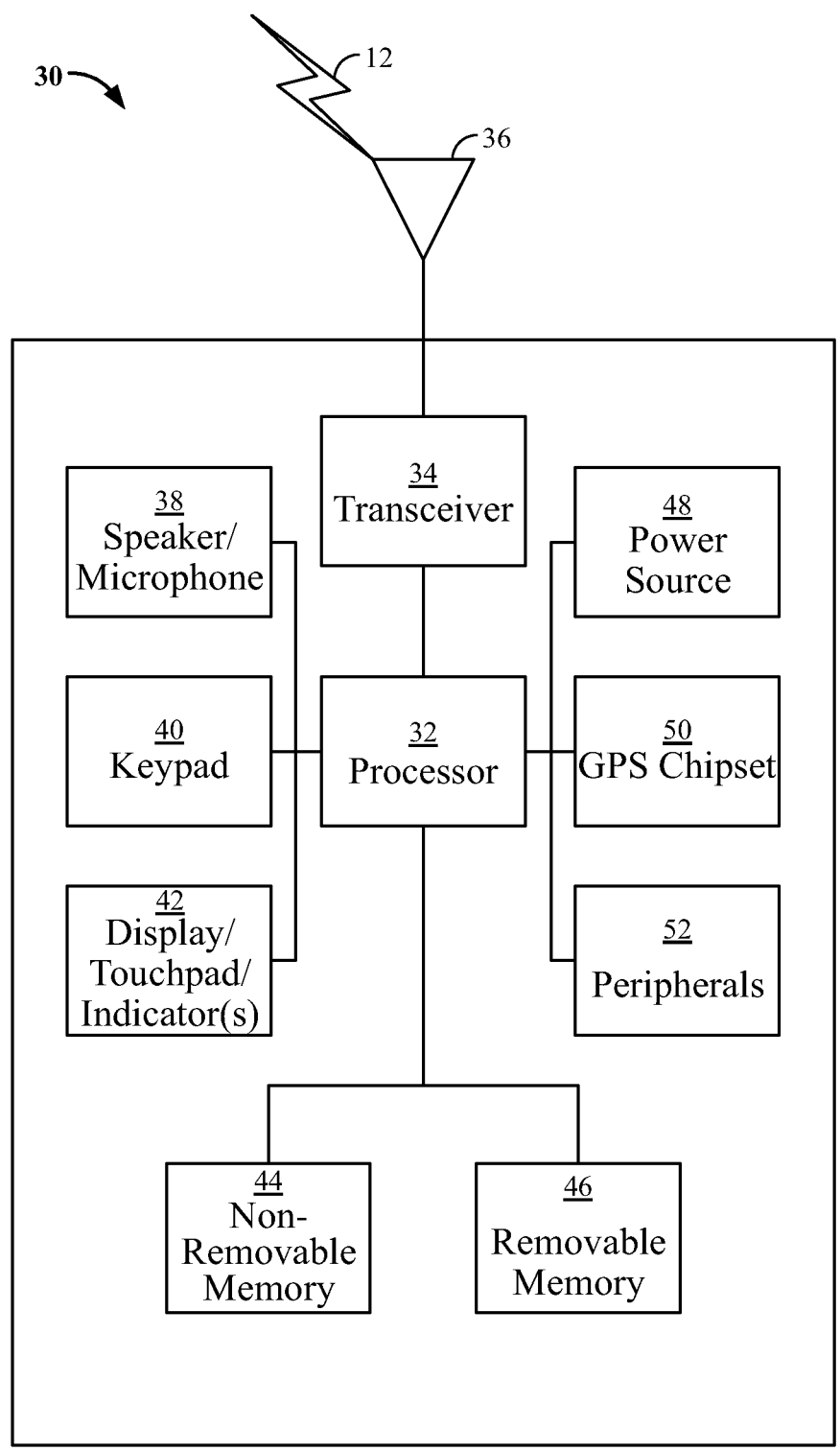
FIG. 12C is a system diagram of an example M2M/IoT terminal or gateway device that may be used within the communications system illustrated in FIG. 12A.

FIG. 12C is a block diagram of an example hardware/ software architecture of a M2M network node 30, such as an M2M Terminal Device 18, an M2M Gateway 14, an M2M server, or the like. The node 30 can execute or include logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102. The device 30 can be part of an M2M network, such as M2M Terminal device 18 or M2M Gateway 14, as shown in FIG. 12A-B or part of a non-M2M network. As shown in FIG. 12C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 12C, the processor 32 is coupled to its communication circuitry (e.g., transceiver 34 and transmit/ receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 12C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12D:
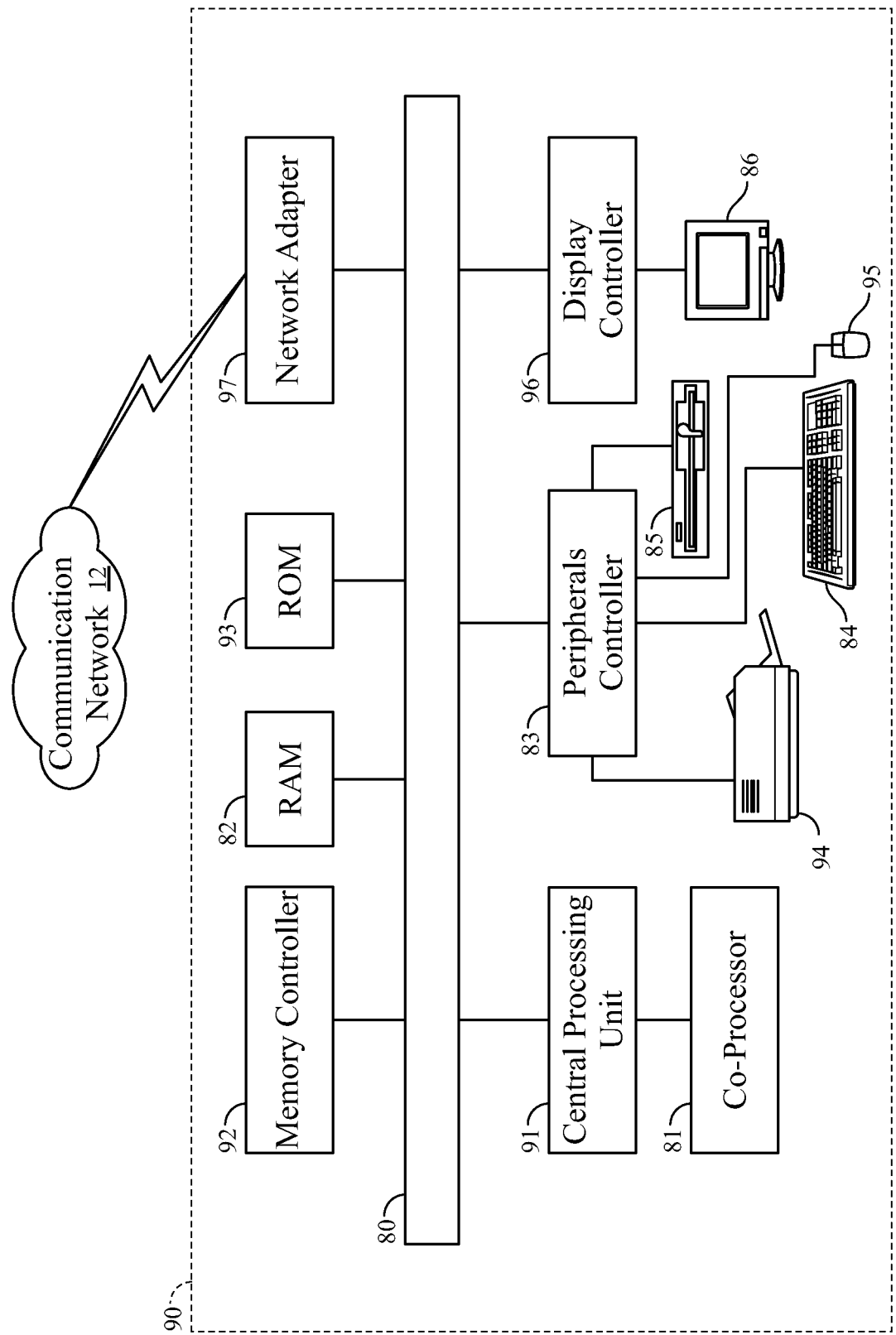
FIG. 12D is a block diagram of an example computing system in which aspects of the communication system of FIG. 12A may be embodied.

FIG. 12D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 12A and FIG. 12B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as the SGW 116, the PGW 110, the 3GPP AAA server 108, PCRF 128 HSS 126, MME 114, HeNB GW 120, local gateway 118, cellular network access network 118, such as HeNB, TWAN 106, WLAN AN 102, TWAG 120, TWAP 124, logical entities at UE 122 and 123 and logical entities to produce interfaces such as interface 1102 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A wireless transmit/receive unit (WTRU) comprising a transceiver and one or more processors, the WTRU configured to:
   send a first request to create a first packet data network (PDN) connection (i) to a PDN, and (ii) associated with a 3GPP access network;
   send a second request to create a second PDN connection (i) to the PDN and (ii) associated with a non-3GPP access network, wherein the second request comprises a multi-connection indication indicating that packets can be routed to the PDN through the 3GPP access network or through the non-3GPP access network; and
   assign, based on one or more policies, packets of traffic to the 3GPP access network or the non-3GPP access network.

2. The WTRU of claim 1, wherein the WTRU comprises a user equipment (UE).

3. The WTRU of claim 1, wherein the first PDN connection comprises cellular connection, and wherein the second PDN connection comprises a wireless local area network (WLAN) connection.

4. The WTRU of claim 1, wherein the assigning the traffic is based on one or more signal conditions.

5. The WTRU of claim 1, wherein the one or more policies are stored by the WTRU.

6. The WTRU of claim 1, wherein the assignment of packets is performed on a packet-by-packet basis.

7. The WTRU of claim 1, wherein access to the PDN via one of the first and second PDN connections occurs for a period of time as long as conditions allow.

8. The WTRU of claim 1, wherein downlink traffic is carried over same PDN connection as uplink traffic.

9. A method for use in a wireless transmit/receive unit (WTRU) comprising a transceiver and one or more processors, the method comprising:
   sending a first request to create a first packet data network (PDN) connection (i) to a PDN, and (ii) associated with a 3GPP access network;
   sending a second request to create a second PDN connection (i) to the PDN, and ((ii associated with a non-3GPP access network, wherein the second request comprises a multi-connection indication indicating that packets can be routed to the PDN through the 3GPP access network or through the non-3GPP access network connection or simultaneously through both the first PDN connection and the second PDN connection; and
   assigning, based on one or more policies, packets of traffic to the 3GPP access network or the non-3GPP access network.

10. The method of claim 9, wherein the WTRU comprises a user equipment (UE).

11. The method of claim 9, wherein the first PDN connection comprises cellular connection, and wherein the second PDN connection comprises a wireless local area network (WLAN) connection.

12. The method of claim 9, wherein the one or more policies are stored by the WTRU.

* * * * *